(12) United States Patent
Zhang

(10) Patent No.: US 9,610,868 B2
(45) Date of Patent: Apr. 4, 2017

(54) LATERAL PROTECTING MECHANISM AND CHILD SAFETY SEAT THEREWITH

(71) Applicant: Da Liang Zhang, Guangdong (CN)

(72) Inventor: Da Liang Zhang, Guangdong (CN)

(73) Assignee: BP Children's Products HK Co., Limited, Wanchai (HK)

( * ) Notice: Subject to any disclaimer, the term of this patent is extended or adjusted under 35 U.S.C. 154(b) by 48 days.

(21) Appl. No.: 14/816,058

(22) Filed: Aug. 2, 2015

(65) Prior Publication Data

US 2016/0039319 A1    Feb. 11, 2016

(30) Foreign Application Priority Data

Aug. 6, 2014    (CN) .......................... 2014 1 0384242

(51) Int. Cl.
  *B60N 2/42* (2006.01)
  *B60R 21/00* (2006.01)
  *B60N 2/28* (2006.01)

(52) U.S. Cl.
  CPC ......... *B60N 2/2872* (2013.01); *B60N 2/2851* (2013.01); *B60N 2/2881* (2013.01); *B60N 2/2884* (2013.01); *B60N 2/2887* (2013.01); *B60N 2/2869* (2013.01); *B60N 2/4235* (2013.01); *B60N 2002/2896* (2013.01)

(58) Field of Classification Search
  CPC .. B60N 2/2869; B60N 2/2884; B60N 2/2872; B60N 2/2851; B60N 2/2881; B60N 2/2887; B60N 2/4235

USPC .... 297/216.12, 216.11, 256.12, 250.11, 397, 297/410, 408, 400
See application file for complete search history.

(56) References Cited

U.S. PATENT DOCUMENTS 7,533,933 B2 *  5/2009  Pos ..................... B60N 2/2851
                                                       297/250.1
8,967,720 B2 *  3/2015  Davis .................. B60R 22/001
                                                       297/216.12
2001/0054837 A1 * 12/2001 O'Connor ............. A47C 7/383
                                                       297/397

(Continued)

FOREIGN PATENT DOCUMENTS

EP    2 826 662 A1    1/2015
GB       2484193 A    4/2012

(Continued)

*Primary Examiner* — Chi Q Nguyen
(74) *Attorney, Agent, or Firm* — Winston Hsu; Scott Margo

(57) ABSTRACT

A lateral protecting mechanism is disposed on a lateral wing of a child safety seat. The lateral protecting mechanism includes a lateral protecting block and a protecting component. An end of the lateral protecting block is pivoted to the lateral wing. The lateral protecting block is movable between a using position and a folding position. The protecting component is slidably disposed on the other end of the lateral protecting block. The protecting component protrudes from a side of the lateral protecting block and is located between the lateral wing and the lateral protecting block when the lateral protecting block rotates away from the lateral wing and is located at the using position, and the protecting component is received in the side of the lateral protecting block when the lateral protecting block rotates toward the lateral wing and is located at the folding position.

20 Claims, 23 Drawing Sheets

(56) References Cited

U.S. PATENT DOCUMENTS

2002/0145318 A1\* 10/2002 Asbach ............... B60N 2/2812
                                                    297/250.1
2002/0158499 A1\* 10/2002 Clough ................... A47C 7/38
                                                    297/410
2009/0152913 A1    6/2009 Amesar

FOREIGN PATENT DOCUMENTS

| TW | 258115       | 9/1995  |
|----|--------------|---------|
| TW | 376860       | 12/1999 |
| TW | 200711897    | 4/2007  |
| WO | 2007003923 A1| 1/2007  |
| WO | 2013189819 A1| 12/2013 |

\* cited by examiner

LATERAL PROTECTING MECHANISM AND CHILD SAFETY SEAT THEREWITH

BACKGROUND OF THE INVENTION

1. Field of the Invention

The present invention relates to a lateral protecting mechanism, and more particularly, to a lateral protecting mechanism with simple structure and effectively capable of absorbing a lateral impact, and a child safety seat therewith.

2. Description of the Prior Art

Child safety seats are designed for children with different weights or at different ages and are installed on cars for effectively ensuring children's safety. For example, when an emergency brake or a forward collision occurs, the child safety seat can absorb a forward impact on a child and prevent the child's body from moving forward rapidly, which avoids a second collision. When a backward collision occurs, a headrest and a backrest of the child safety seat can respectively support the child's head and body for preventing the child's neck from being injured due to swinging backward rapidly, which can reduce the child's injury and provides effects of protecting, buffering, and restraining for effectively ensuring the child's safety. Therefore, child safety seats become more and more popular widely.

However, when a lateral collision occurs, a conventional child safety seat cannot provide an enough protecting effect for ensuring a child's safety because a lateral impact merely can be absorbed by lateral wings of the headrest and the backrest of the conventional child safety seat.

Therefore, there is a need to design a child safety seat with simple structure and capable of effectively absorbing a lateral impact to solving the aforementioned problems.

SUMMARY OF THE INVENTION

The present invention aims at providing a lateral protecting mechanism with simple structure, which is adapted for a child safety seat and capable of effectively absorbing a lateral impact.

The present invention further aims at providing a child safety seat with simple structure and capable of effectively absorbing a lateral impact.

According to the claimed invention, a lateral protecting mechanism is disposed on a lateral wing of a child safety seat. The lateral protecting mechanism includes a lateral protecting block and a protecting component. An end of the lateral protecting block is pivoted to the lateral wing. The lateral protecting block is movable between a using position and a folding position. The protecting component is slidably disposed on the other end of the lateral protecting block. The protecting component protrudes from a side of the lateral protecting block and is located between the lateral wing and the lateral protecting block when the lateral protecting block rotates away from the lateral wing and is located at the using position, and the protecting component is received in the side of the lateral protecting block when the lateral protecting block rotates toward the lateral wing and is located at the folding position.

Preferably, the lateral protecting block includes a base, an installing wall, and a connecting wall. A contacting surface is formed on a side of the base. The installing wall and the connecting wall protrude from the other side of the base and are opposite to each other. The lateral protecting block is pivoted to the lateral wing by the connecting wall. The protecting component is slidably disposed on the installing wall, and the protecting component protrudes from the installing wall and is located between the lateral wing and the base when the lateral protecting block is located at the using position.

Preferably, an opening is formed on the installing wall. The protecting component is slidably disposed in the opening, and the protecting component slides to be received in the opening when the lateral protecting block is located at the folding position.

Preferably, the protecting component includes a cube and a resilient member. The cube is slidably disposed in the opening, and two ends of the resilient member abut between the cube and the lateral protecting block.

Preferably, the cube includes a body and a pressing portion. The body is corresponding to the opening. The pressing portion is formed on a side of the body. The body is slidably disposed in the opening, and when the lateral protecting block is located at the using position, the pressing portion protrudes from the installing wall, such that the body is located between the lateral wing and the base.

Preferably, the cube further includes a buffering rib protruding from the pressing portion and abutting against the lateral wing.

Preferably, the cube further includes a sliding portion. The lateral protecting mechanism includes a guiding member disposed on the lateral protecting block, and the cube is slidably connected to the opening by the sliding portion and the guiding member.

Preferably, the sliding portion is a protrusion disposed on an end of the cube. The guiding member is a groove formed on the lateral protecting block, and the protrusion is slidably received in the groove.

Preferably, the lateral protecting mechanism further includes a restraining member passing through the protrusion and slidably connected to the groove.

Preferably, the sliding portion is a guiding slot formed on the cube. The guiding member is a column protruding from the lateral protecting block, and the guiding slot is slidably sheathed on the column.

Preferably, the lateral protecting mechanism further includes a restraining block fixed on the lateral protecting block, and the cube is clamped between the restraining block and the lateral protecting block.

Preferably, the lateral protecting block includes an operating part protruding outwardly and bent from an edge of the installing wall away from the contacting surface.

Preferably, the lateral protecting block further includes a positioning protrusion perpendicularly protruding from the installing wall. The lateral protecting mechanism further includes a resilient protrusion formed on the lateral wing and corresponding to the positioning protrusion, and the resilient protrusion engages with the positioning protrusion when the lateral protecting block is located at the folding position.

Preferably, the lateral protecting block further includes a pivoting portion protruding from the connecting wall and pivoted to the lateral wing.

Preferably, the lateral protecting mechanism further includes a pressing block fixed on the lateral wing. The pressing block includes a resilient finger protruding toward the installing wall. A socket is formed on a side of the protecting component protruding from the installing wall, and the resilient finger detachably engages with the socket.

Preferably, the lateral protecting mechanism further includes a fixing member fixed on the lateral wing. The fixing member is pivoted to an end of the lateral protecting block pivoted to the lateral wing.

According to the claimed invention, a child safety seat includes a seat, a seatback, and two lateral protecting mechanisms. The seatback includes two lateral wings opposite to each other. The two lateral protecting mechanisms are disposed on the two lateral wings of the child safety seat respectively. Each of the two lateral protecting mechanisms includes a lateral protecting block and a protecting component. The lateral protecting block is pivoted between a using position and a folding position. The protecting component is slidably disposed on the lateral protecting block. The protecting component protrudes from a side of the lateral protecting block and is located between the lateral wing and the lateral protecting block when the lateral protecting block moves away from the lateral wing and is located at the using position, and the protecting component is received in the side of the lateral protecting block when the lateral protecting block moves toward the lateral wing and is located at the folding position.

Preferably, an end of the lateral protecting block is pivoted to the lateral wing, the protecting component is slidably disposed on the other end of the lateral protecting block, the protecting component protrudes from the side of the lateral protecting block and is located between the lateral wing and the lateral protecting block when the lateral protecting block rotates away from the lateral wing and is located at the using position, and the protecting component is received in the side of the lateral protecting block when the lateral protecting rotates toward the lateral wing and is located at the folding position.

Preferably, two installing holes are formed on the two lateral wings and corresponding to the two lateral protecting mechanisms, and the two lateral protecting mechanisms are pivoted to the two lateral wings and received in the two installing holes respectively.

Preferably, the child safety seat further includes two covers connected to the two lateral wings. Two through holes are formed on the two covers and corresponding to the two lateral protecting mechanisms. Each of the two lateral protecting mechanisms is received in the corresponding through hole, and each of the two protecting components detachably abutting against the corresponding cover.

In summary, the present invention provides the lateral protecting mechanism with simple structure and the child safety seat therewith. Since the protecting component is located between the lateral swing and the lateral protecting block when the lateral protecting mechanism of the present invention is in use, the lateral protecting block will contact with a car body for effectively absorbing a lateral impact when a lateral collision occurs, which effectively ensures a child's safety.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
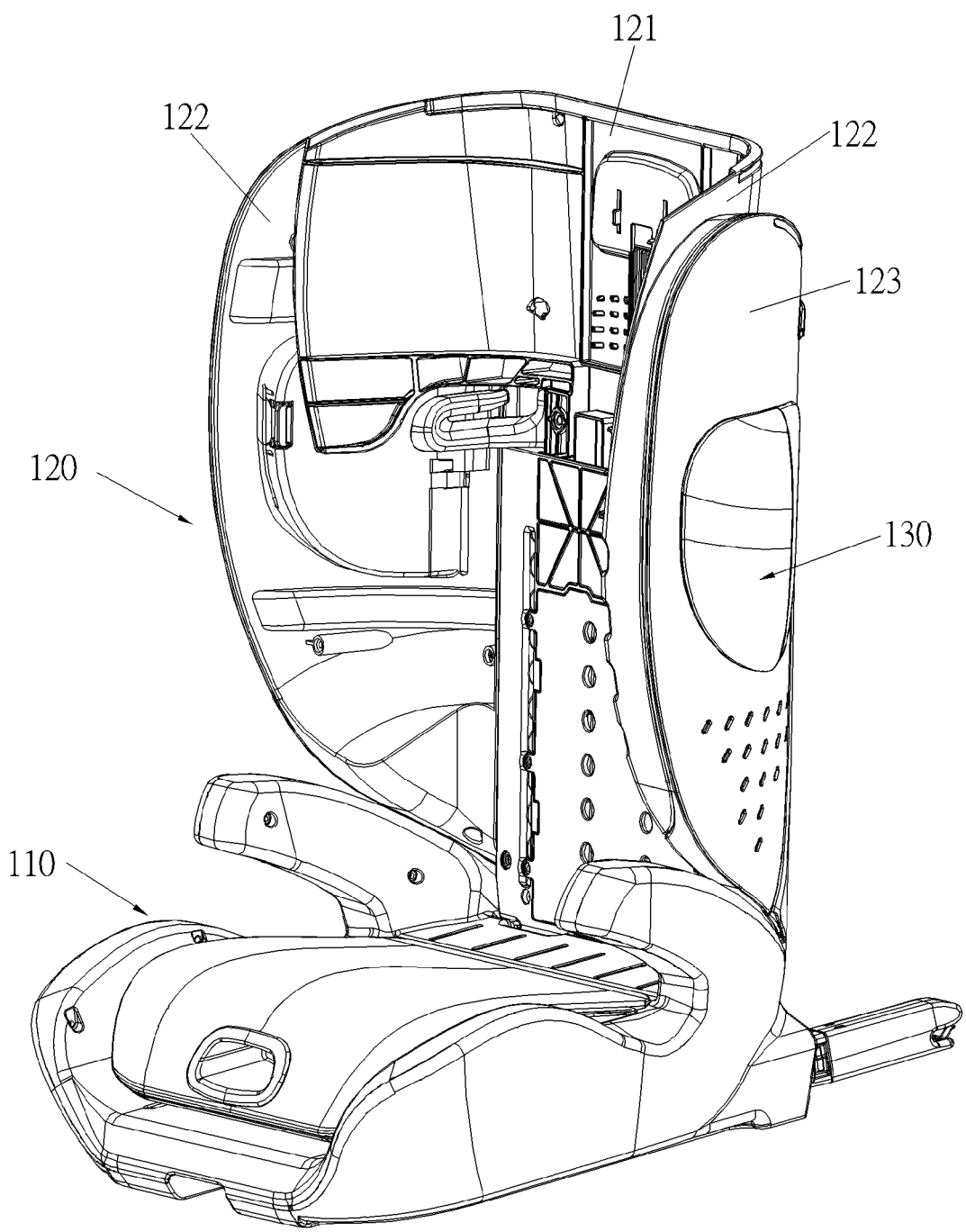
FIG. 1 is a schematic diagram of a child safety seat according to a first embodiment of the present invention.
Figure 2:
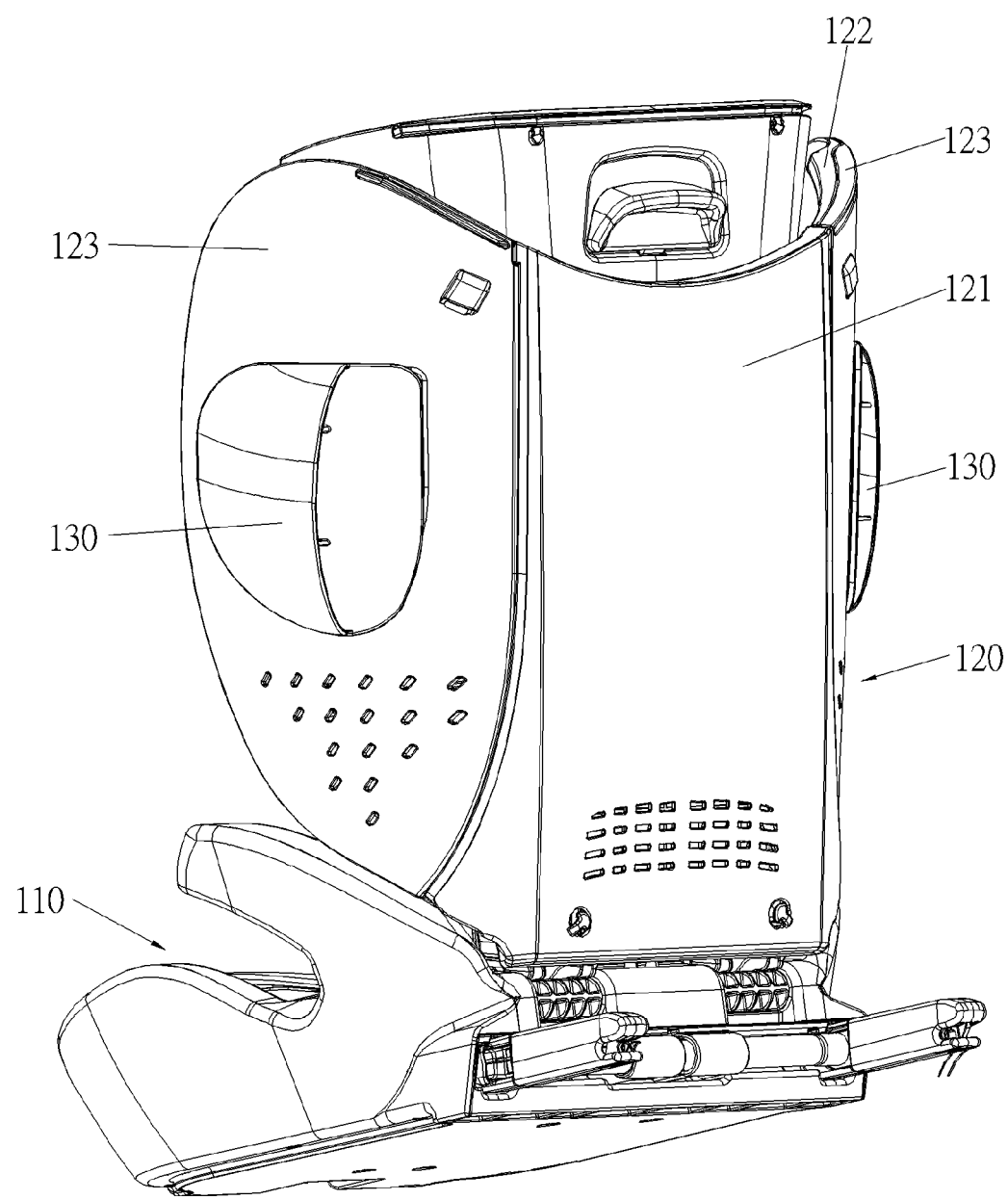
FIG. 2 is a schematic diagram of the child safety seat at another view according to the first embodiment of the present invention.
Figure 3:
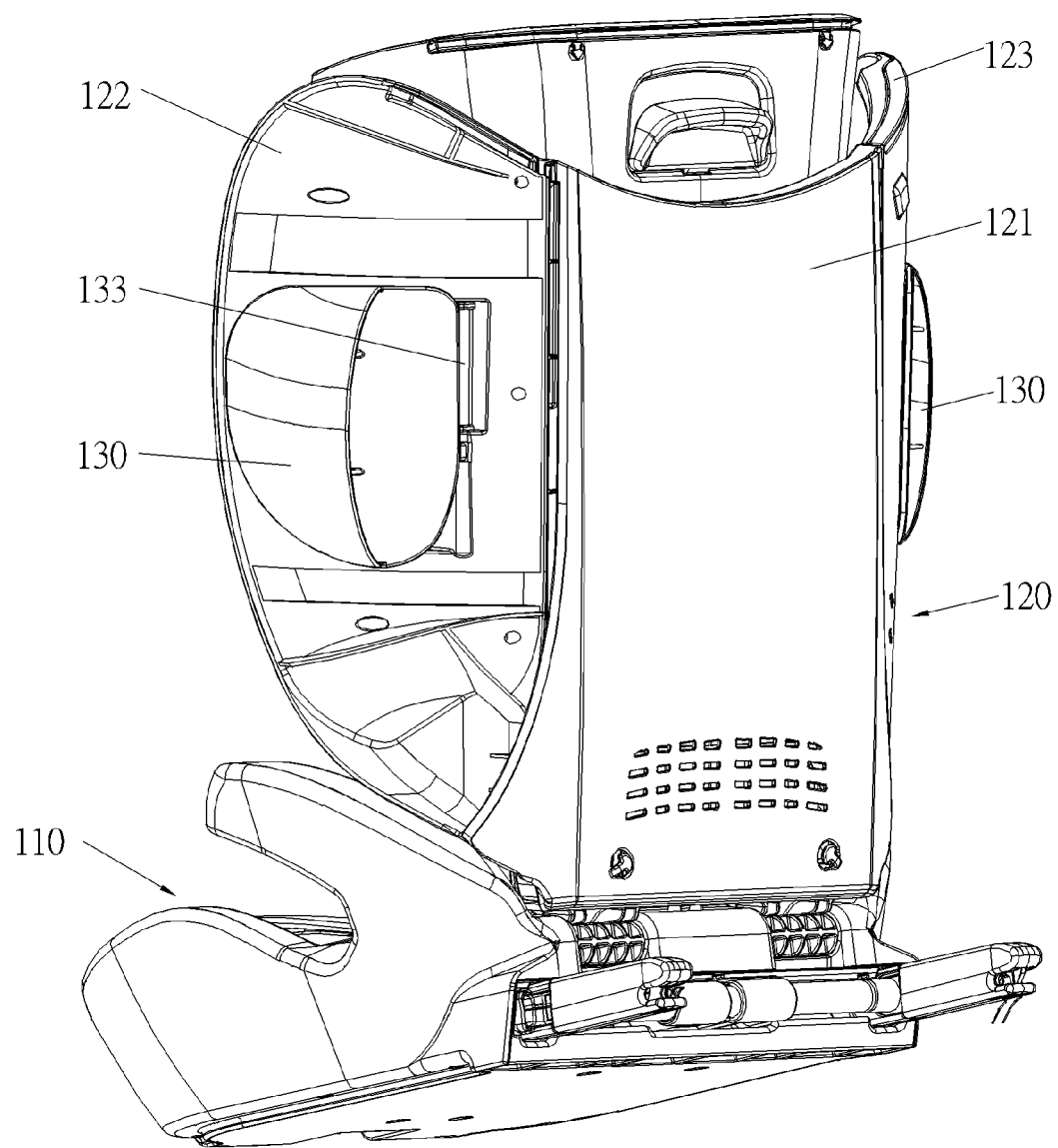
FIG. 3 is a schematic diagram of the child safety seat without illustrating a cover according to the first embodiment of the present invention.
Figure 4:
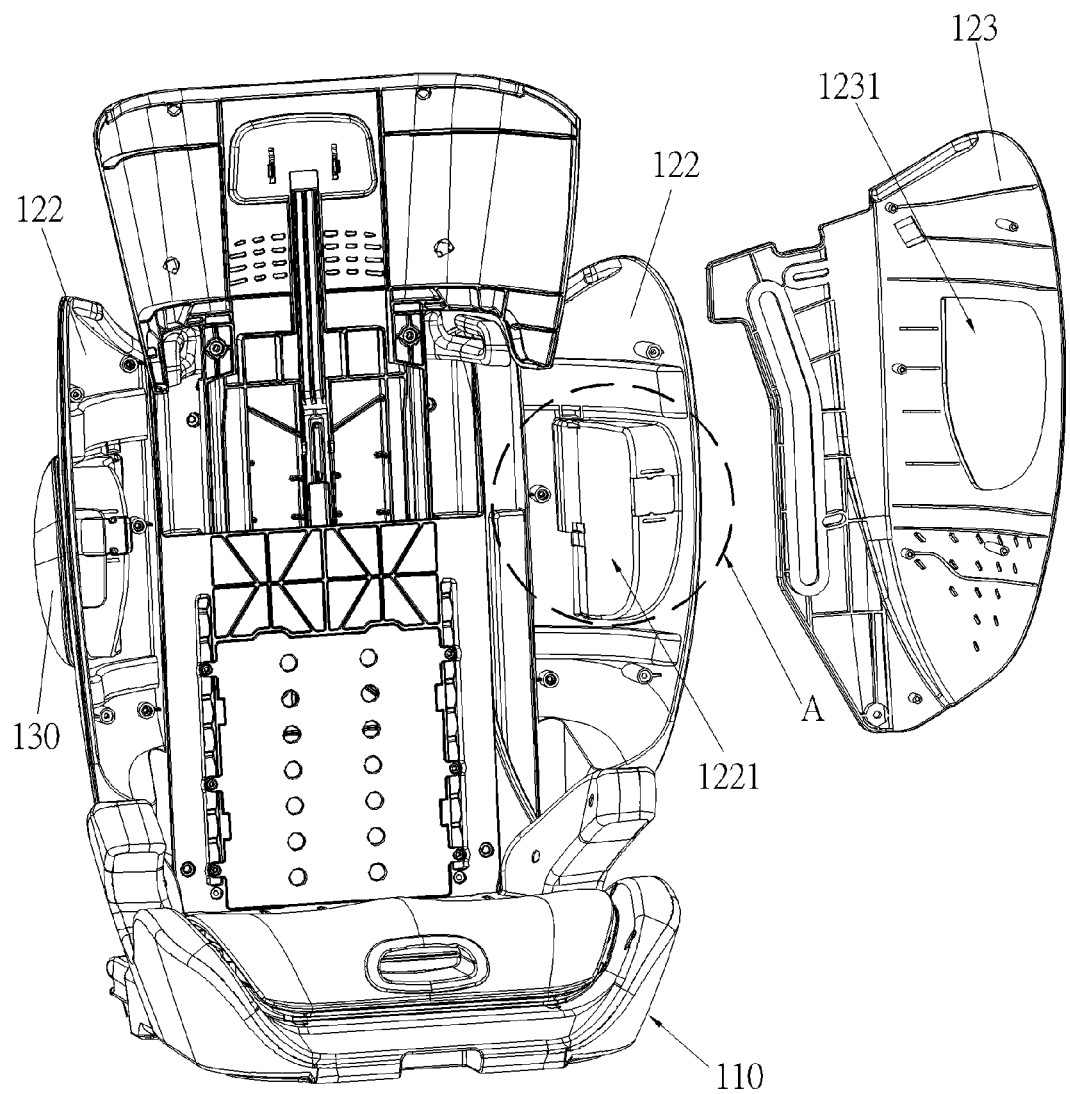
FIG. 4 is a schematic diagram of the child safety seat without illustrating a lateral protecting mechanism according to the first embodiment of the present invention.

Please refer to FIG. 1 to FIG. 4. FIG. 1 is a schematic diagram of a child safety seat 100 according to a first embodiment of the present invention. FIG. 2 is a schematic diagram of the child safety seat 100 at another view according to the first embodiment of the present invention. FIG. 3 is a schematic diagram of the child safety seat 100 without illustrating a cover 123 according to the first embodiment of the present invention. FIG. 4 is a schematic diagram of the child safety seat 100 without illustrating a lateral protecting mechanism 130 according to the first embodiment of the present invention. As shown in FIG. 1 to FIG. 4, in the first embodiment, the child safety seat 100 of the present invention includes a seat 110, a seatback 120, and two lateral protecting mechanisms 130. The seatback 120 includes a seatback body 121 and two lateral wings 122 disposed on two opposite sides of the seatback body 121. The two lateral protecting mechanisms 130 are respectively disposed on the two lateral wings 122. In such a way, when a lateral collision happens to the child safety seat 100, the lateral protecting mechanism 130 can contact with a car body firstly for absorbing a lateral impact, which provides a better protecting effect.

Figure 5:
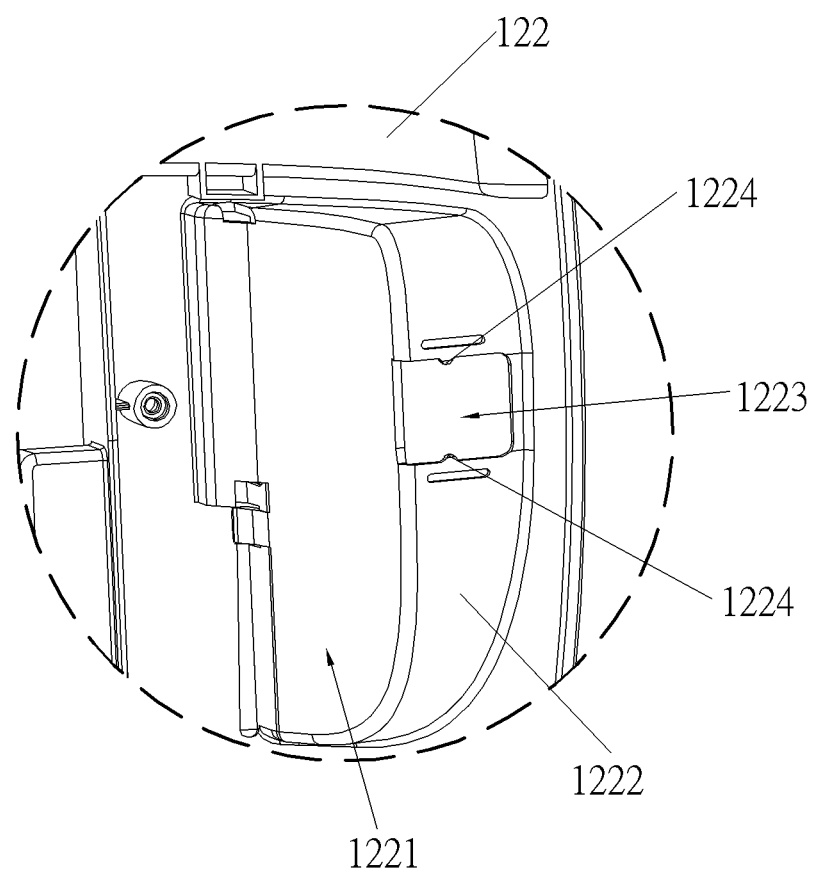
FIG. 5 is an enlarged diagram of an A portion of the child safety seat shown in FIG. 4 according to the first embodiment of the present invention.

Please refer to FIG. 4 and FIG. 5. FIG. 5 is an enlarged diagram of an A portion of the child safety seat 100 shown in FIG. 4 according to the first embodiment of the present invention. As shown in FIG. 4 and FIG. 5, two installing holes 1221 are formed on the two lateral wings 122 and corresponding to the two lateral protecting mechanisms 130. The two lateral protecting mechanisms 130 are respectively pivoted to the two lateral wings 122 and respectively received in the two installing holes 1221. Furthermore, the child safety seat 100 further includes two covers 123 respectively connected to two outer sides of the two lateral wings 122. Two through holes 1231 are respectively formed on the two covers 123 and corresponding to the two lateral protecting mechanisms 130, as shown in FIG. 4. The two through holes 1231 are also corresponding to the two installing holes 1221 on the two lateral wings 122 respectively. The lateral protecting mechanism 130 is pivoted to the lateral wing 122, such that the lateral protecting mechanism 130 can pass through the through hole 1231, protrude from the cover 123 and rotate between a using position and a folding position. When the lateral protecting mechanism 130 rotates away from the cover 123 to the using position, the lateral protecting mechanism 130 is supported on the cover 123 for absorbing a lateral impact. An exterior surface of the lateral protecting mechanism 130 is closely connected to the cover 123, and the other end of the lateral protecting mechanism 130 passes through the through hole 1231 and the installing hole 1221 to engage with the lateral wing 122 when the lateral protecting mechanism 130 rotates to the folding position.

Figure 6:
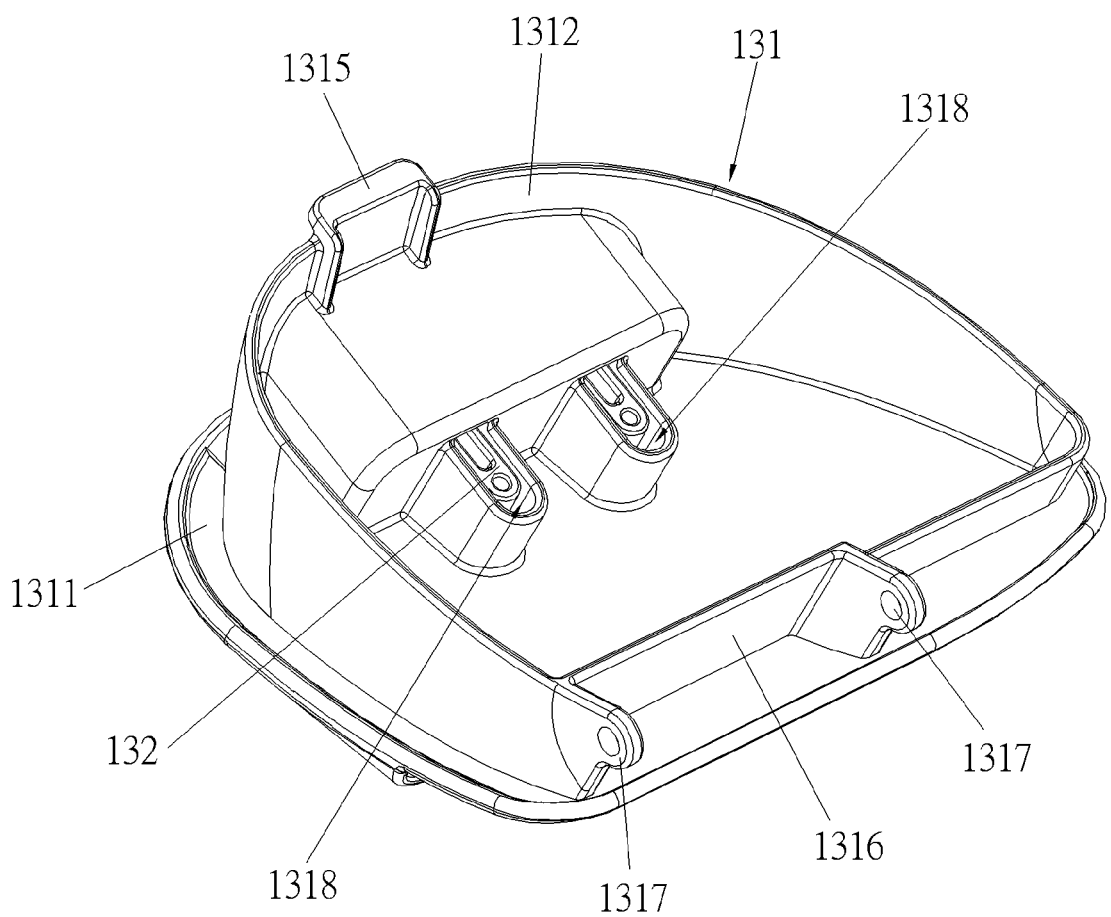
FIG. 6 is a schematic diagram of the lateral protecting mechanism of the child safety seat according to the first embodiment of the present invention.
Figure 7:
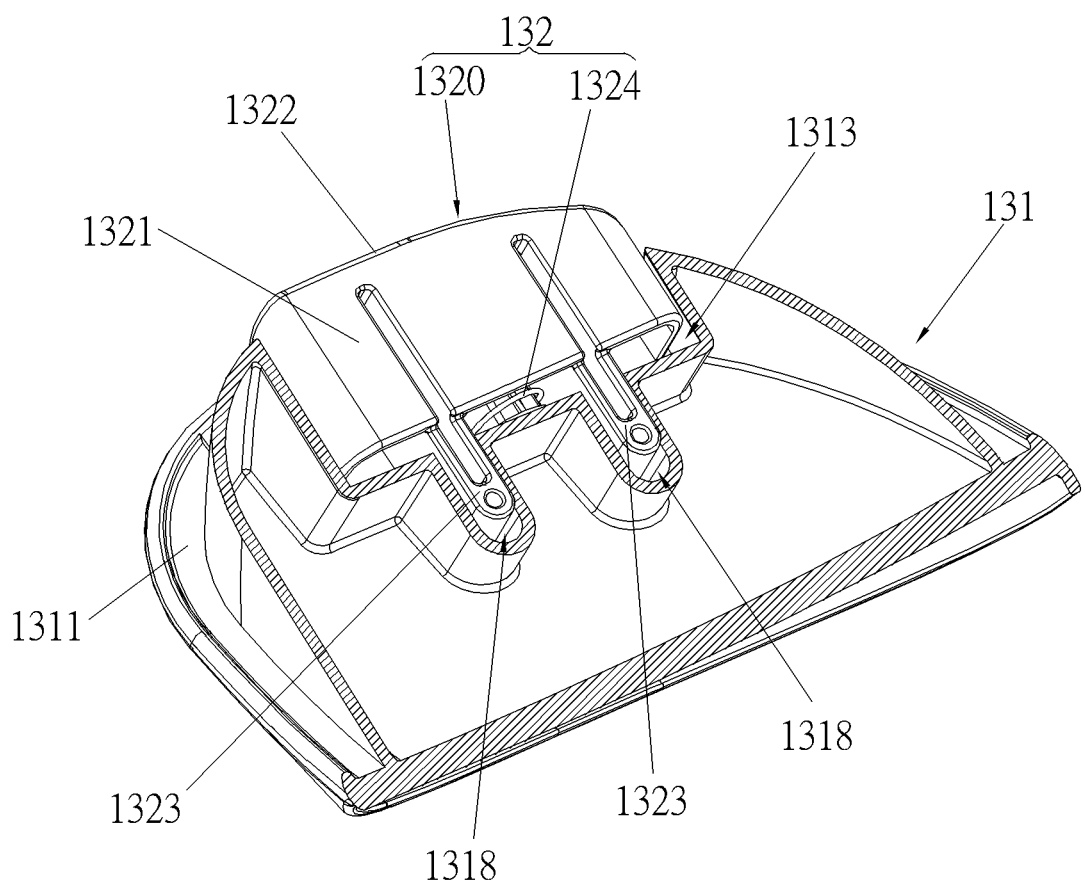
FIG. 7 is a sectional diagram of the lateral protecting mechanism of the child safety seat according to the first embodiment of the present invention.
Figure 8:
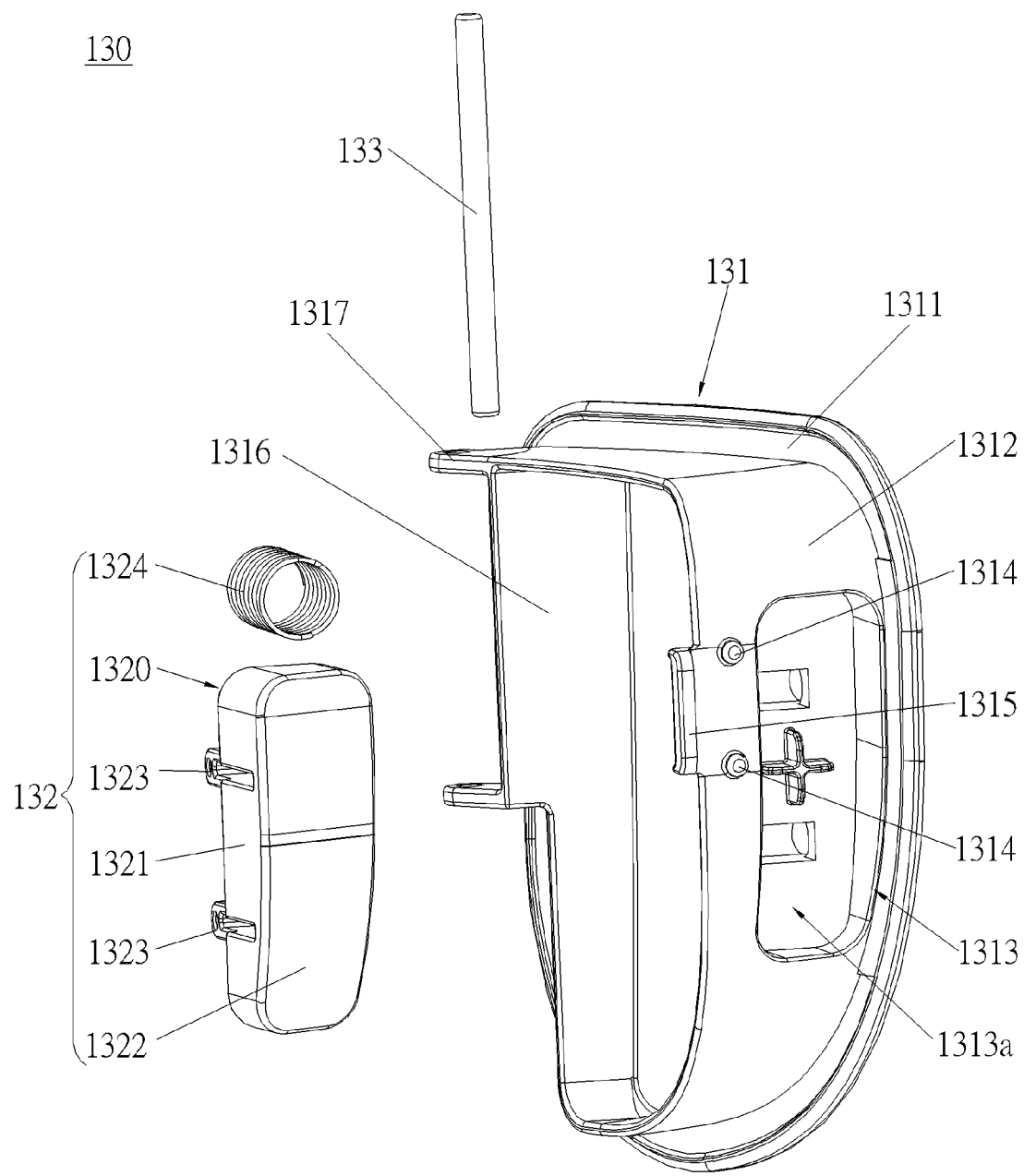
FIG. 8 is an exploded diagram of the lateral protecting mechanism of the child safety seat according to the first embodiment of the present invention.
Figure 9:
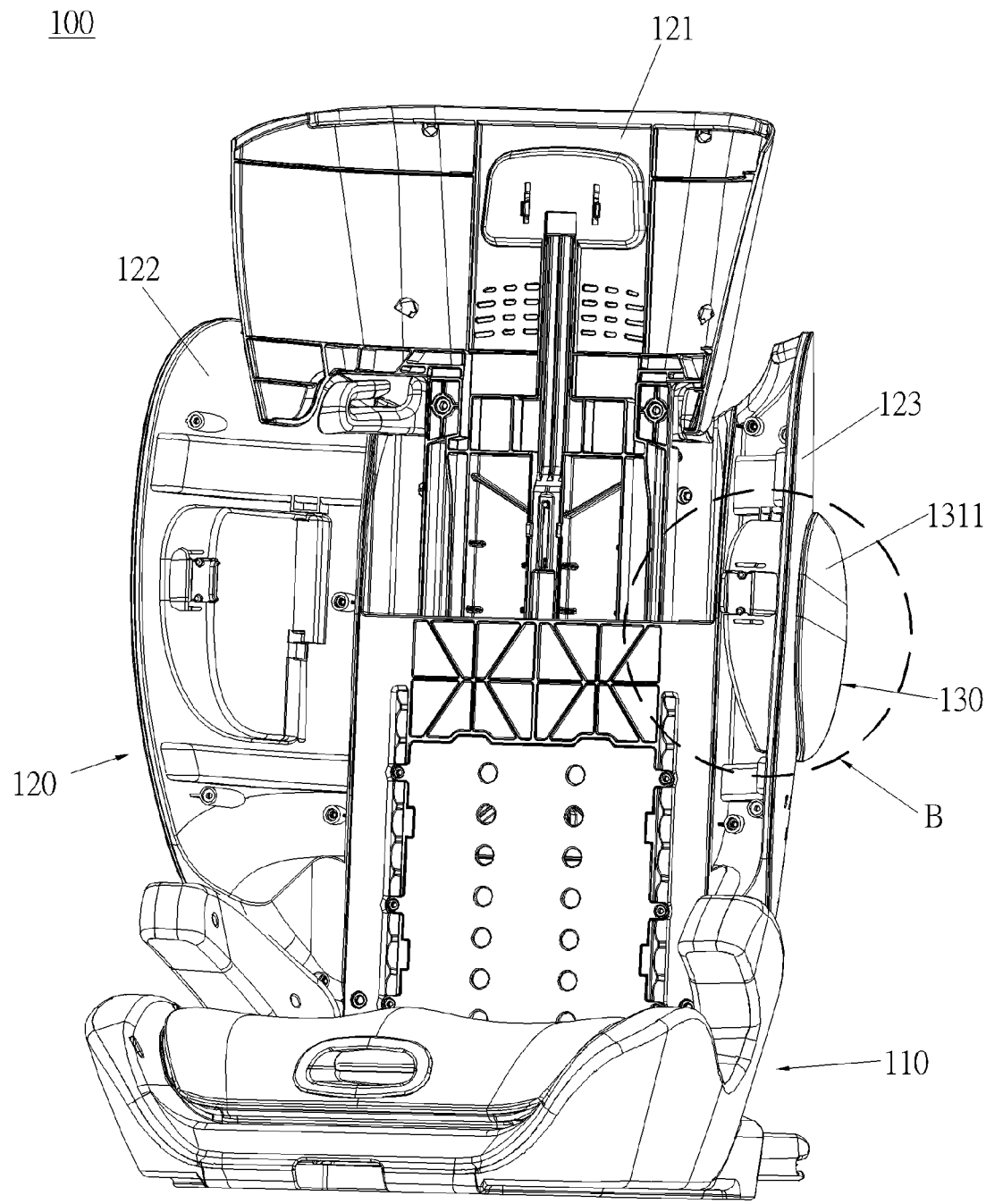
FIG. 9 is a schematic diagram of the child safety seat at the other view according to the first embodiment of the present invention.
Figure 10:
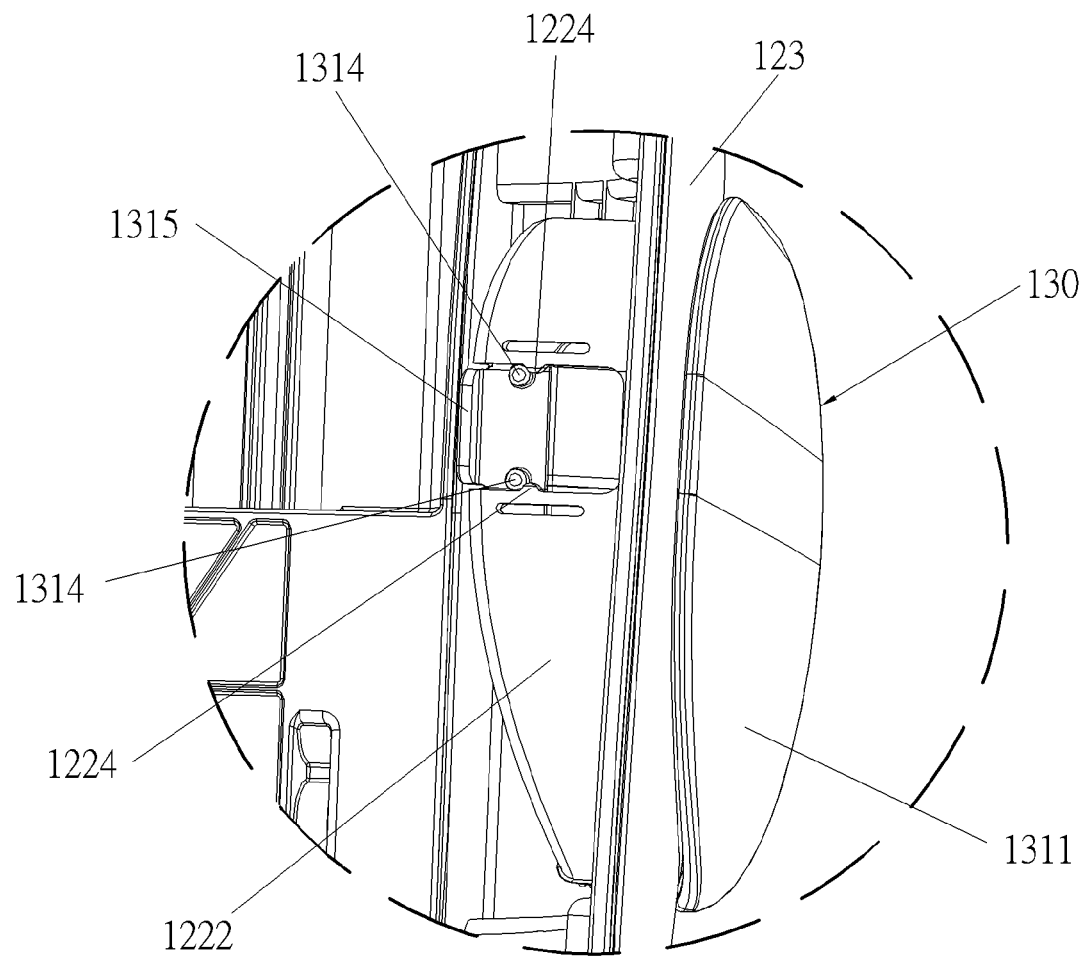
FIG. 10 is an enlarged diagram of a B portion of the child safety seat shown in FIG. 9 according to the first embodiment of the present invention.
Figure 11:
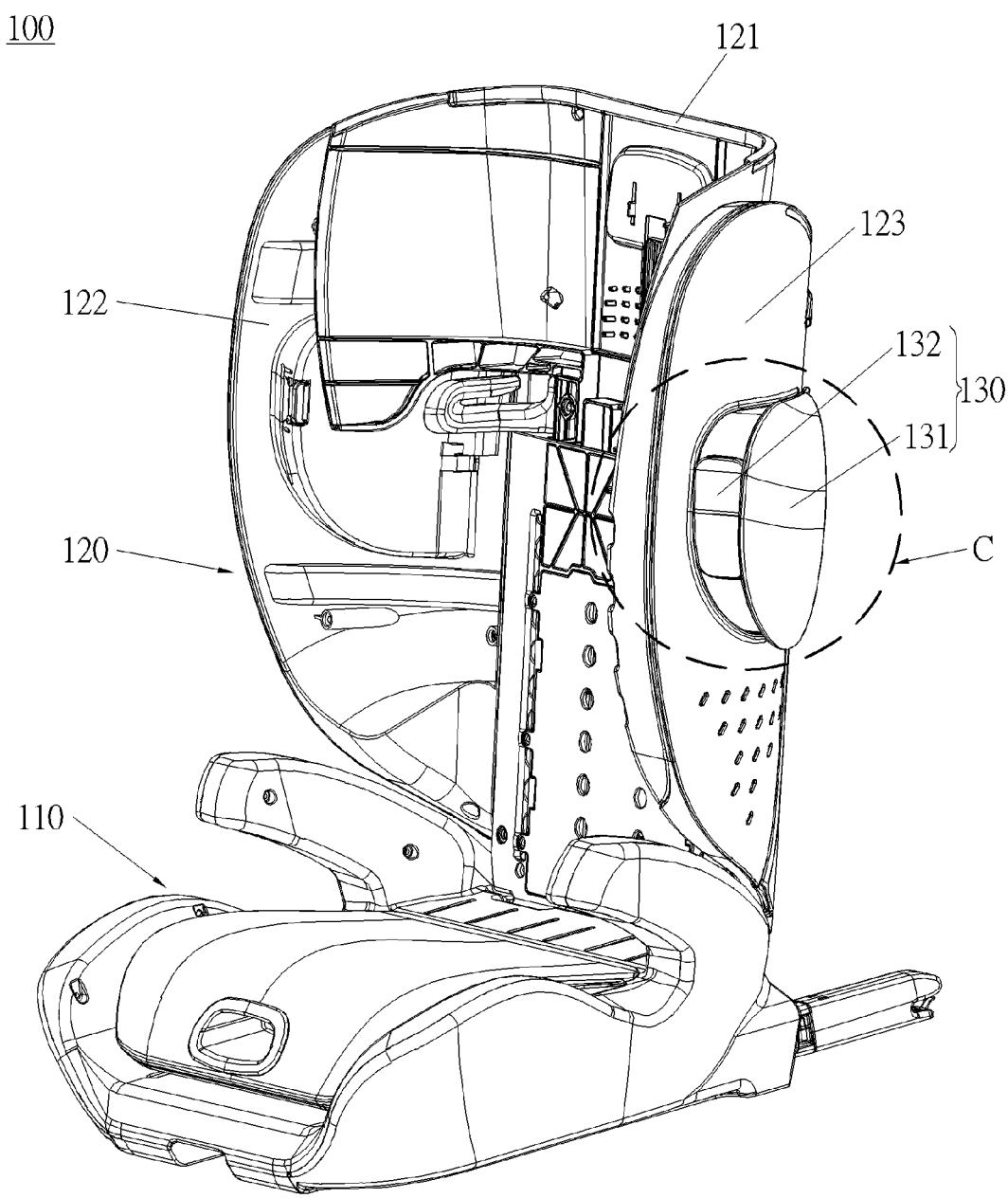
FIG. 11 is a schematic diagram illustrating the lateral protecting mechanism of the child safety seat in use according to the first embodiment of the present invention.
Figure 12:
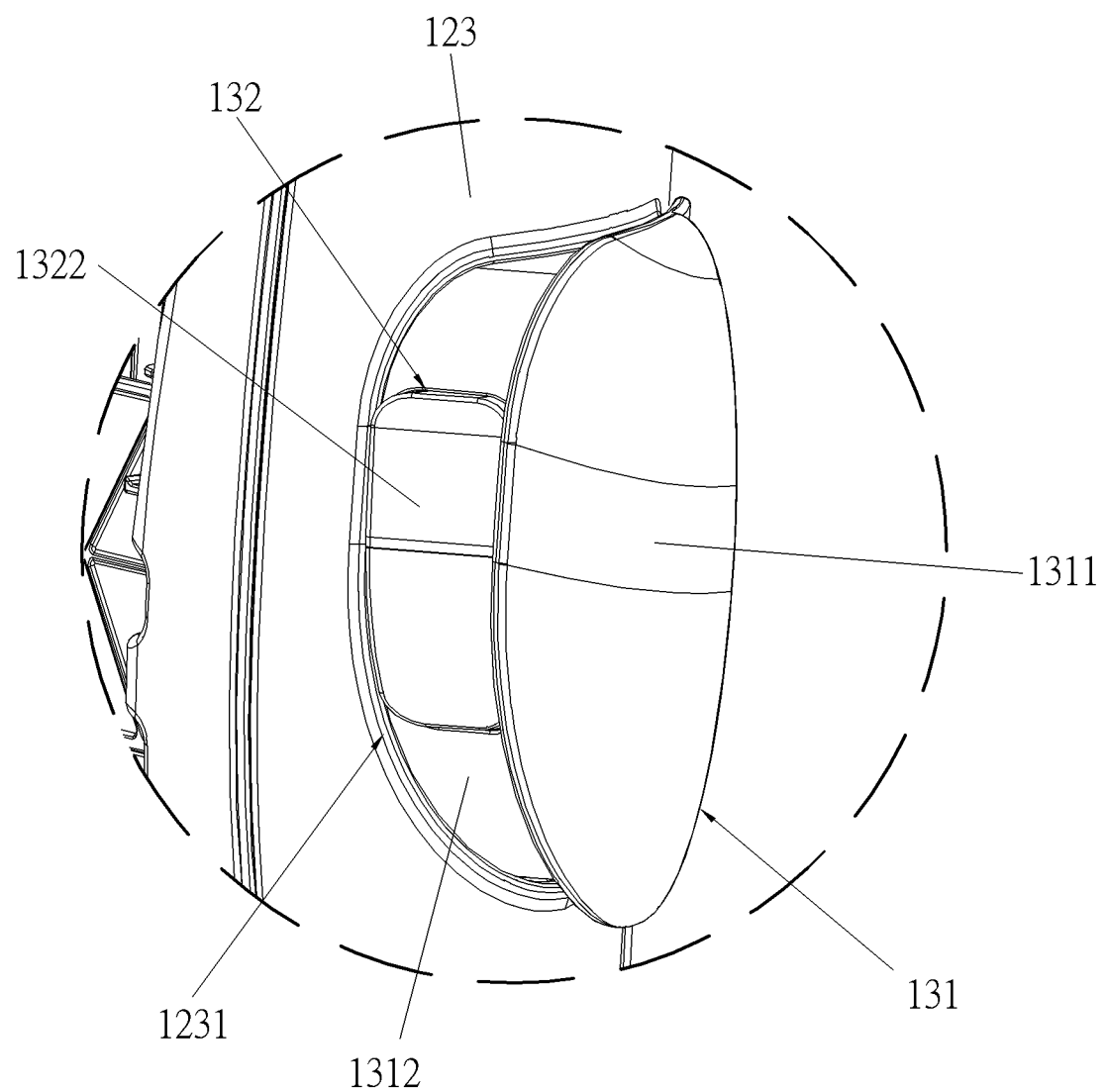
FIG. 12 is an enlarged diagram of a C portion of the child safety seat shown in FIG. 11 according to the first embodiment of the present invention.

Please refer to FIG. 1 to FIG. 12. FIG. 6 is a schematic diagram of the lateral protecting mechanism 130 of the child safety seat 100 according to the first embodiment of the present invention. FIG. 7 is a sectional diagram of the lateral protecting mechanism 130 of the child safety seat 100 according to the first embodiment of the present invention. FIG. 8 is an exploded diagram of the lateral protecting mechanism 130 of the child safety seat 100 according to the first embodiment of the present invention. FIG. 9 is a schematic diagram of the child safety seat 100 at the other view according to the first embodiment of the present invention. FIG. 10 is an enlarged diagram of a B portion of the child safety seat 100 shown in FIG. 9 according to the first embodiment of the present invention. FIG. 11 is a schematic diagram illustrating the lateral protecting mechanism 130 of the child safety seat 100 in use according to the first embodiment of the present invention. FIG. 12 is an enlarged diagram of a C portion of the child safety seat 100 shown in FIG. 11 according to the first embodiment of the present invention.

As shown in FIG. 3, FIG. 4 and FIG. 8, in this embodiment, each of the two lateral protecting mechanisms 130 includes a lateral protecting block 131, a protecting component 132, and a shaft 133. An end of the lateral protecting block 131 is pivoted to the lateral wing 122 by the shaft 133, as shown in FIG. 3. The protecting component 132 is slidably disposed on a side of the other end of the lateral protecting block 131. The lateral protecting block 131 is received in the installing hole 1221 of the lateral wing 122 and the through hole 1231 of the cover 123 and is capable of protruding from the cover 123. The protecting component 132 slides to protrude from the side of the lateral protecting block 131 when the lateral protecting block 131 rotates away from the lateral wing 122. Two opposite sides of the protecting component 132 are clamped between the cover 123 and the lateral protecting block 131, such that the lateral protecting block 131 is located at the using position. When the lateral protecting block 131 rotates toward the lateral wing 122 and the exterior surface of the lateral protecting block 131 is closely connected to the cover 123, the lateral protecting block 131 is located at the folding position. In the meantime, the protecting component 132 has already slid to be received in the side of the lateral protecting block 131.

Please refer to FIG. 6 to FIG. 8. As shown in FIG. 6 to FIG. 8, the lateral protecting block 131 includes a base 1311, an installing wall 1312, and a connecting wall 1316. A contacting surface is formed on a side of the base 1311, i.e., the contacting surface is the exterior surface of the lateral protecting block 131. When a lateral impact occurs, the child safety seat 100 can contact with an inner body of a car or a vehicle via the contacting surface. The installing wall 1312 and the connecting wall 1316 protrude from the other side of the base 1311 and are opposite to each other. A height of the installing wall 1312 relative to the base 1311 is higher than a height of the connecting wall 1316 relative to the base 1311. The lateral protecting block 131 is pivoted to the lateral wing 122 by the connecting wall 1316. The installing wall 1312 passes through the through hole 1231 and the installing hole 1221 to detachably engage with the lateral wing 122 and the cover 123, such that the contacting surface protrudes from the cover 123. Furthermore, the protecting component 132 is slidably disposed on the installing wall 1312, and a sliding direction of the protecting component 132 is perpendicular to the installing wall 1312. When the lateral protecting block 131 is located at the using position, the protecting component 132 protrudes from the installing wall 1312 and is located between the lateral wing 122 and the base 1311.

Specifically, the lateral protecting block 131 further includes a pivoting portion 1317 protruding from the connecting wall 1316, as shown in FIG. 6. A connecting hole (not indicated in figures) is formed on the pivoting portion 1317. The shaft 133 passes through the connecting hole to be connected to the lateral wing 122, such that the lateral protecting block 131 is pivoted to the lateral wing 122. The installing wall 1312 is located near an edge of the base 1311, i.e., the installing wall 1312 is spaced from the edge of the base 1311 at a distance. An opening 1313 is formed on the installing wall 1312. The protecting component 132 is slidably disposed in the opening 1313. When the lateral protecting block 131 is located at the using position, the protecting component 132 protrudes from the installing wall 1312 and is located between the cover 123 and the edge of the base 1311. When it is desired to fold the lateral protecting block 131, the protecting component 132 is pressed to slide to be received in the opening 1313, such that the lateral protecting block 131 is rotatable relative to the shaft 133 for connecting the base 1311 to the cover 123 closely.

As shown in FIG. 8, the protecting component 132 includes a cube 1320 and a resilient member 1324. The cube 1320 is slidably disposed in the opening 1313. The resilient member 1324 is received in the opening 1313, and two ends of the resilient member 1325 abut against the cube 1320 and a bottom wall of the opening 1313. Specifically, the cube 1320 includes a body 1321 and a pressing portion 1322. The body 1321 is corresponding to the opening 1313. The pressing portion 1322 is formed on a side on the body 1321. The body 1321 is slidably disposed in the opening 1313, and the pressing portion 1322 is exposed out of the installing wall 1312. An end of the resilient member 1324 is received in the body 1321 and abuts against the body 1321. The other end of the resilient member 1324 abuts against the bottom wall of the opening 1313. When the lateral protecting block 131 is located at the using position, the pressing portion 1322 protrudes from the installing wall 1312 by a resilient force provided by the resilient member 1324, such that two opposite sides of the body 1321 abut against the cover 123 and the base 1311 respectively. Preferably, the resilient member 1324 can be a spring. However, it is not limited thereto.

Please refer to FIG. 6 to FIG. 8. In this embodiment, a receiving slot 1313a is formed in the opening 1313. The protecting component 132 is slidably disposed in the receiving slot 1313a. The cube 1320 further includes a sliding portion. The lateral protecting mechanism 130 further includes a guiding member disposed on the lateral protecting block 131. The cube 1320 is slidably receiving in the opening 1313 by cooperation of the sliding portion and the guiding member. Specifically, the sliding portion is a protrusion 1323 disposed on an end of the cube 1320 away from the pressing portion 1322. The guiding member is a groove 1318 formed on the lateral protecting block 131. The groove 1318 penetrates from a bottom wall of the receiving slot 1313a. The protrusion 1323 passes through the bottom wall of the receiving slot 1313a to be slidably disposed in the groove 1318, as shown in FIG. 7. Furthermore, the lateral protecting mechanism 130 further includes a restraining member (not shown in figures) connected to the protrusion 1323 and slidably connected to the groove 1318 for preventing the cube 1320 from disengaging from the lateral protecting block 131. Preferably, the restraining member can be a screw. However, it is not limited thereto.

As shown in FIG. 8, the lateral protecting block 131 further includes an operating part 1315 and two positioning protrusions 1314. The operating part 1315 protrudes outwardly and is bent from an edge of the installing wall 1312 away from the base 1311. The two positioning protrusions 1314 perpendicularly protrudes from the installing wall 1312, i.e., the two positioning protrusions 1314 are perpendicular to the installing wall 1312. The two positioning protrusions 1314 are located between the receiving slot 1313a and the operating part 1315. Please refer to FIG. 4, FIG. 5, FIG. 9, and FIG. 10. The lateral wing 122 further includes a side plate 1222. The side plate 1222 is located at a position where the installing hole 1221 is formed. The side plate 1222 protrudes inwardly along a direction perpendicular to the lateral wing 122 and is corresponding to the installing wall 1312. An opening 1223 is formed on the side plate 1222. A width of the opening 1223 is corresponding to a width of the operating part 1315. The lateral protecting mechanism 130 further includes two resilient protrusions 1224 formed on two opposite sides of the opening 1223 and protruding inwardly. In this embodiment, the two resilient protrusions 1224 are formed on an upper side and a lower side of the opening 1223 and protrude toward each other.

The two resilient protrusions 1224 cooperate with the two positioning protrusions 1314. When the lateral protecting block 131 is folded, the installing wall 1312 slides along the side plate 1222 inwardly, such that the operating part 1315 is received in the opening 1223, and the two resilient protrusions 1224 engage with the two positioning protrusions 1314 for positioning the lateral protecting block 131, as shown in FIG. 10.

Please refer to FIG. 1 to FIG. 12. The operating principle of the lateral protecting mechanism 130 in this embodiment is described as follows.

When it is not required to use the child safety seat 100, the lateral protecting mechanism 130 is located at the folding position. The lateral protecting block 131 is received in the through hole 1231 of the cover 123. The base 1311 is closely connected to the cover 123. The positioning protrusions 1314 of the installing wall 1312 engage with the resilient protrusions 1224 of the lateral wing 122, as shown in FIG. 9 and FIG. 10. When the child safety seat 100 is located at the using position, the lateral protecting mechanism 130 is to be adjusted to the using position. Specifically, it is required to pull an edge of the lateral protecting block 131 to drive the lateral protecting block 131 to slide along the side plate 1222, such that the positioning protrusions 1314 disengage from the resilient protrusions 1224. Afterward, the lateral protecting block 131 can be pushed to rotate. When the protecting component 132 disengages from an edge of the through hole 1231 of the cover 123, the cube 1320 is driven to protrude from the installing wall 1312 by the resilient force provided by the resilient member 1324, i.e., the pressing portion 1322 of the cube 1320 protrudes from the installing wall 1312, such that two opposite sides of the cube 1320 abut against the cover 123 and the base 1311, which allows the lateral protecting block 131 to be maintained at the using position, as shown in FIG. 11 and FIG. 12. When a lateral collision occurs, the lateral protecting block 131 will contact with an inner body of a car or a vehicle firstly for absorbing a lateral impact, which provides a better protecting effect.

Correspondingly, when it is desired to fold the lateral protecting mechanism 130, the pressing portion 1322 of the cube 1320 is pressed, such that the cube 1320 slides toward the installing wall 1312 along the receiving slot 1313a until the pressing portion 1322 and the installing wall 1312 are located at the same level, or the pressing portion 1322 is located under the installing wall 1312. Afterward, the lateral protecting block 131 can be pushed to rotate, such that the base 1311 is closely connected to the cover 123. In the meantime, the pressing portion 1322 of the cube 1320 abuts against an edge of the installing hole 1221 or the side plate 1222 of the installing hole 1221 for maintaining the cube 1320 at the folding position. The operating part 1315 on the installing wall 1312 is received in the opening 1223 on the sideplate 1222, and the resilient protrusions 1224 engage with the positioning protrusions 1314 for positioning the lateral protecting block 131, as shown in FIG. 9 and FIG. 10. In the aforementioned process, the resilient member 1324 of the protecting component 132 is compressed. When the cube 1320 disengages from the edge of the through hole 1231, the resilient member 1324 has not been compressed anymore, such that the resilient member 1324 resiliently recovers for driving the cube 1320 to protrude from the installing wall 1312 again.

Figure 13:
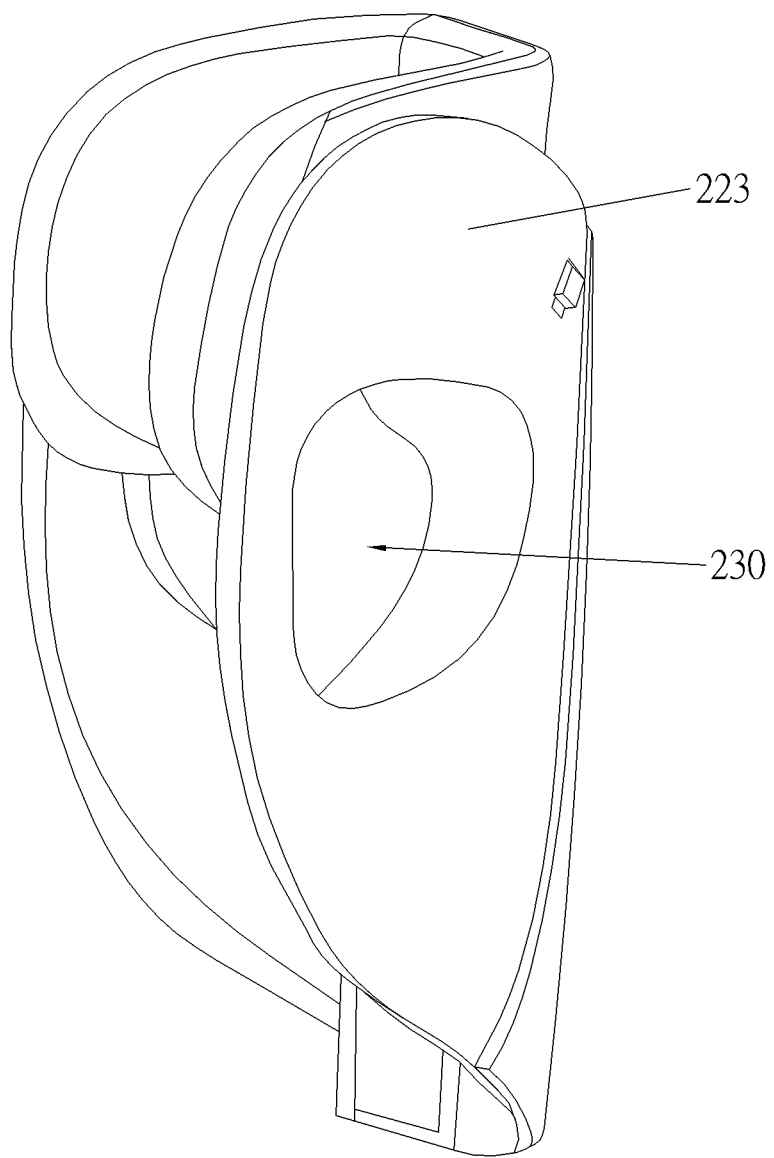
FIG. 13 is a sectional diagram of a child safety seat according to a second embodiment of the present invention.
Figure 14:
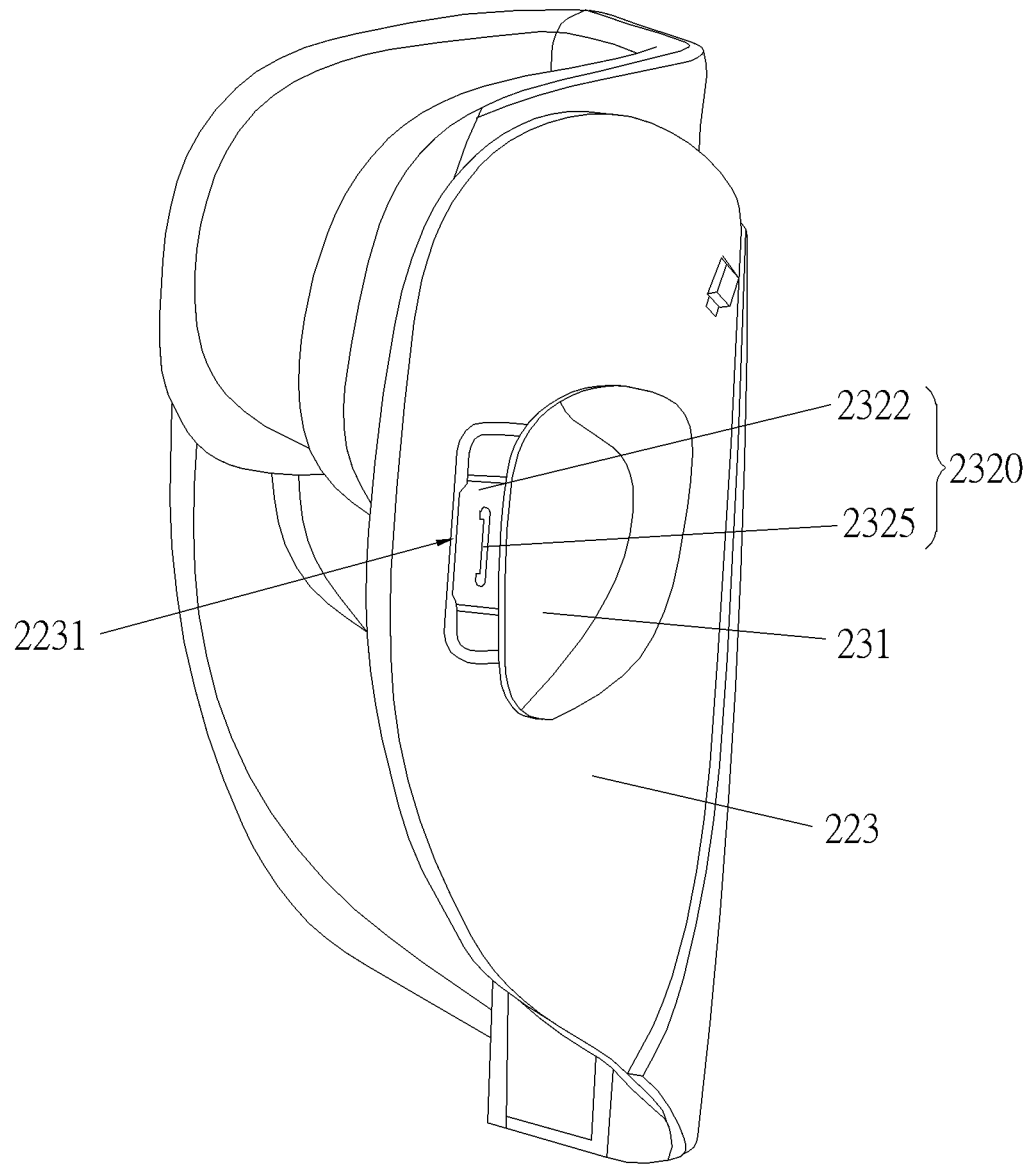
FIG. 14 is a schematic diagram illustrating a lateral protecting mechanism of the child safety seat in use according to the second embodiment of the present invention.
Figure 15:
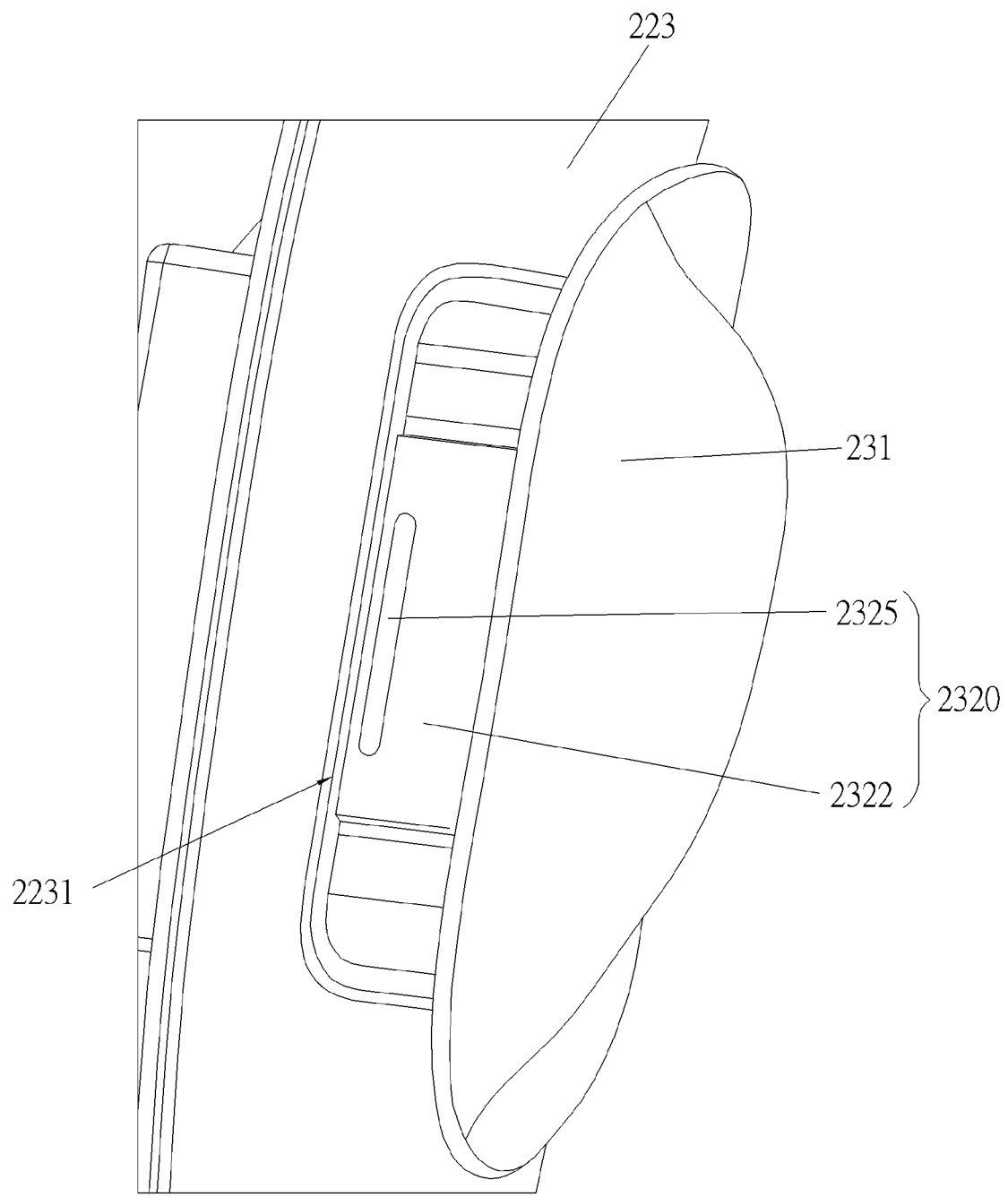
FIG. 15 is an enlarged diagram of the lateral protecting mechanism of the child safety seat according to the second embodiment of the present invention.

Please refer to FIG. 13 to FIG. 15. FIG. 13 is a sectional diagram of a child safety seat 200 according to a second embodiment of the present invention. FIG. 14 is a schematic diagram illustrating a lateral protecting mechanism 230 of the child safety seat 200 in use according to the second embodiment of the present invention. FIG. 15 is an enlarged diagram of the lateral protecting mechanism 230 of the child safety seat 200 according to the second embodiment of the present invention. As shown in FIG. 13 to FIG. 15, the difference between the child safety seat 200 of the second embodiment and the child safety seat 100 of the first embodiment is that structure of a cube 2320 of the lateral protecting mechanism 230 is different from structure of the cube 1320 of the lateral protecting mechanism 130. Other structures of the lateral protecting mechanism 230 are similar to the ones of the lateral protecting mechanism 130. The detail of the cube 2320 is described as follows.

As shown in FIG. 13 to FIG. 15, in this embodiment, the cube 2320 of the lateral protecting mechanism 230 further includes a buffering rib 2325 protruding from a pressing portion 2322 for abutting against a cover 223. Specifically, the buffering rib 2325 is disposed along a longitudinal direction of the cube 2320 and cooperates with an edge of a through hole 2331 of the cover 223. In such a way, when a lateral impact happens on the lateral protecting block 231, the buffering rib 2325 is deformed by abutting against the edge of a through hole 2331 of the cover 223. Accordingly, a buffering effect for absorbing the lateral impact is provided by deformation of the buffering rib 2325, which ensures a child's safety. Other structures of the cube 2320 of the second embodiment are similar to the cube 1320 of the aforementioned embodiment.

Figure 16:
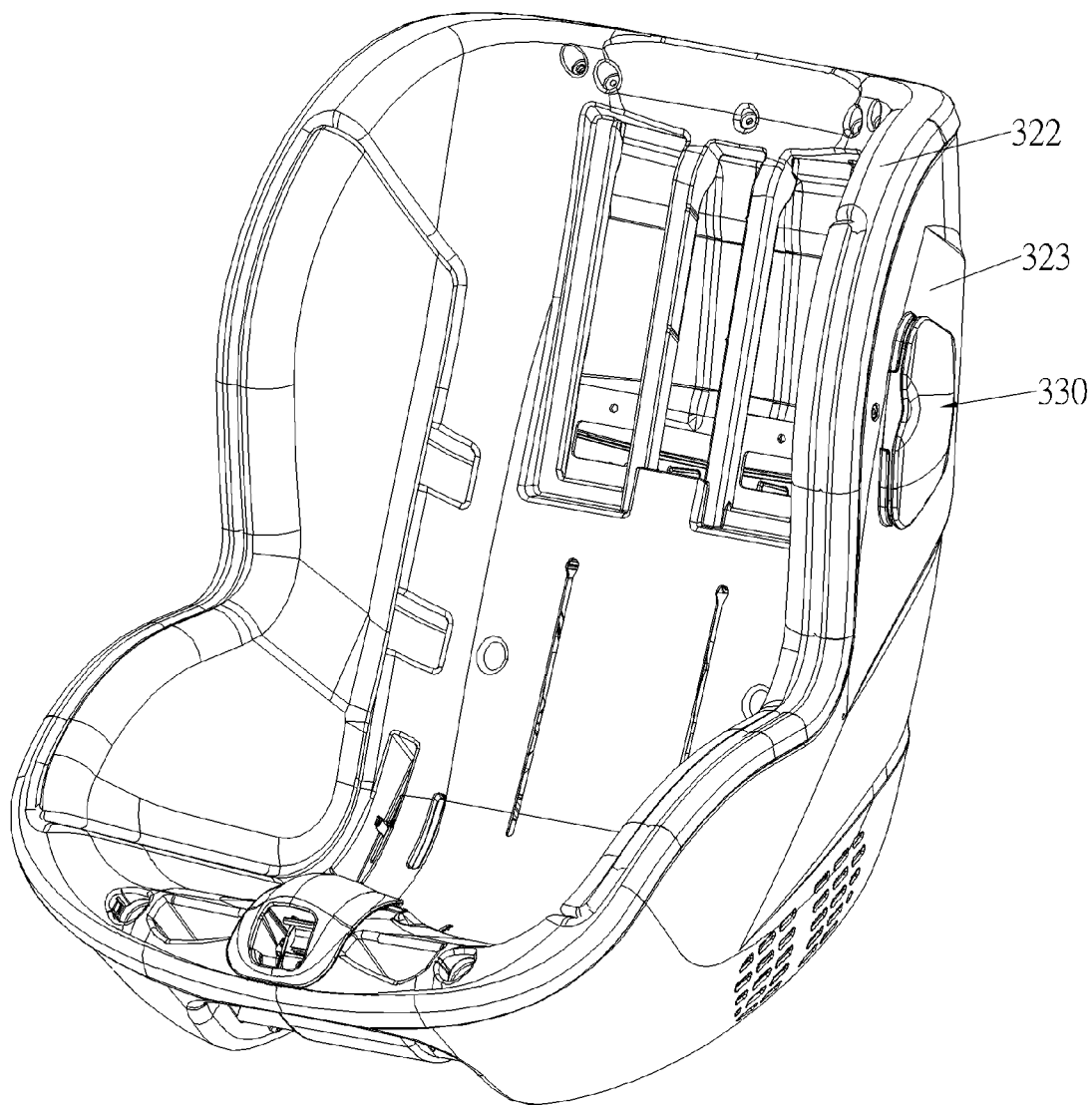
FIG. 16 is a schematic diagram of a child safety seat according to a third embodiment of the present invention.
Figure 17:
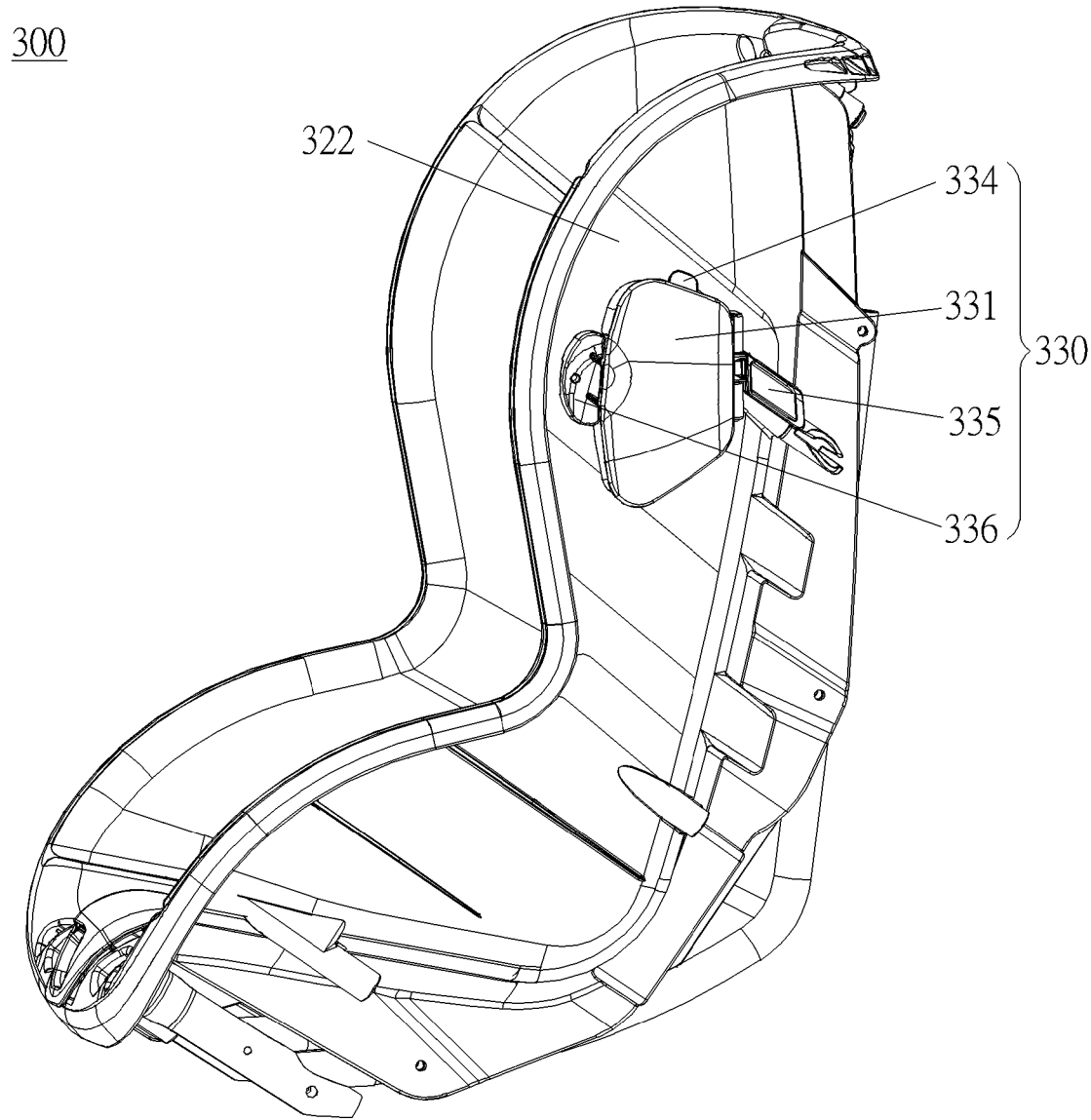
FIG. 17 is a schematic diagram of the child safety seat without illustrating a cover according to the third embodiment of the present invention.
Figure 18:
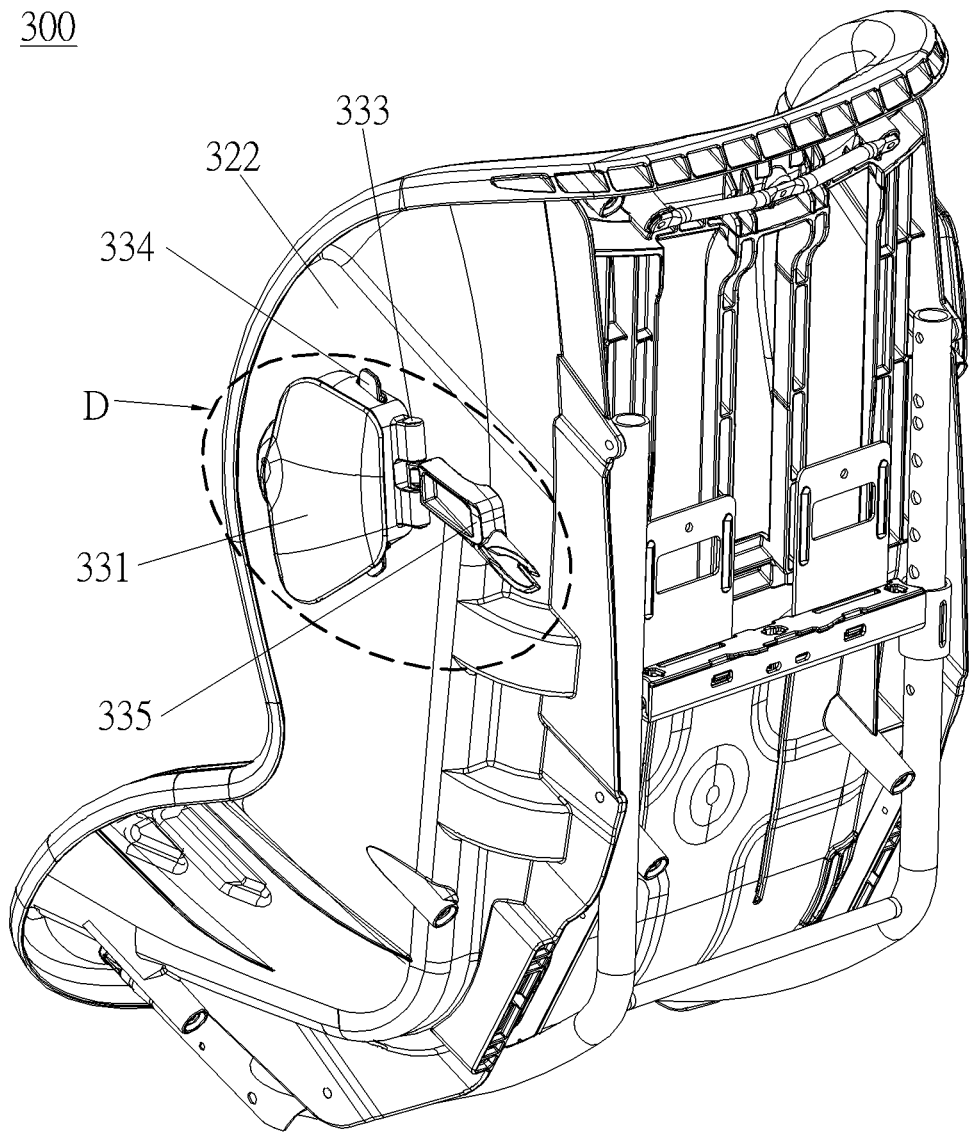
FIG. 18 is a schematic diagram of the child safety seat without illustrating the cover at another view according to the third embodiment of the present invention.
Figure 19:
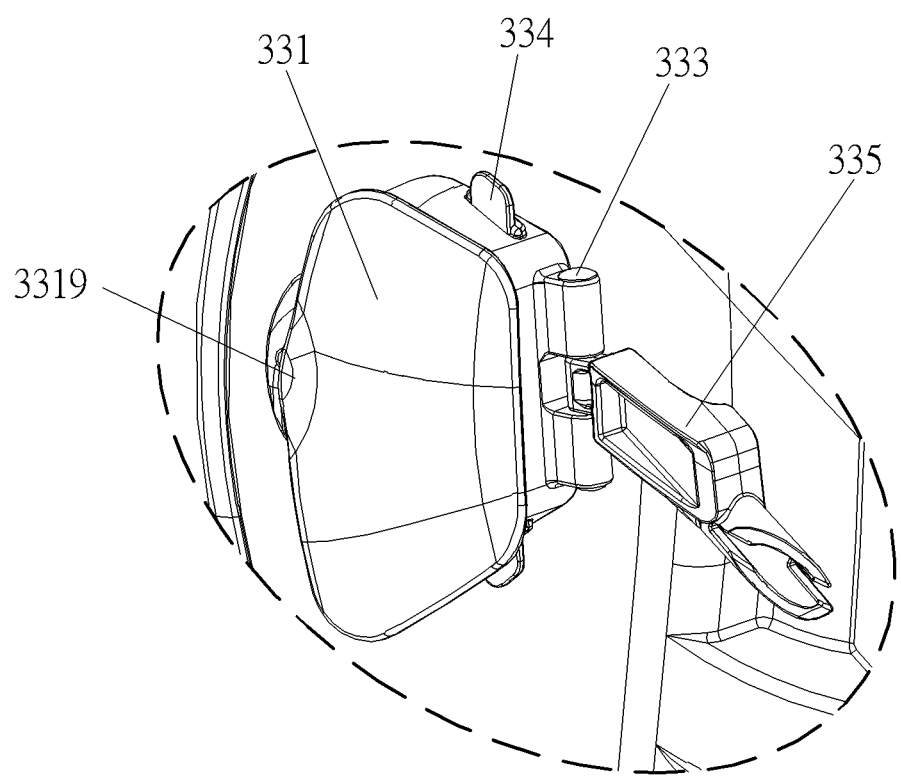
FIG. 19 is an enlarged diagram of a D portion of the child safety seat shown in FIG. 18 according to the third embodiment of the present invention.
Figure 20:
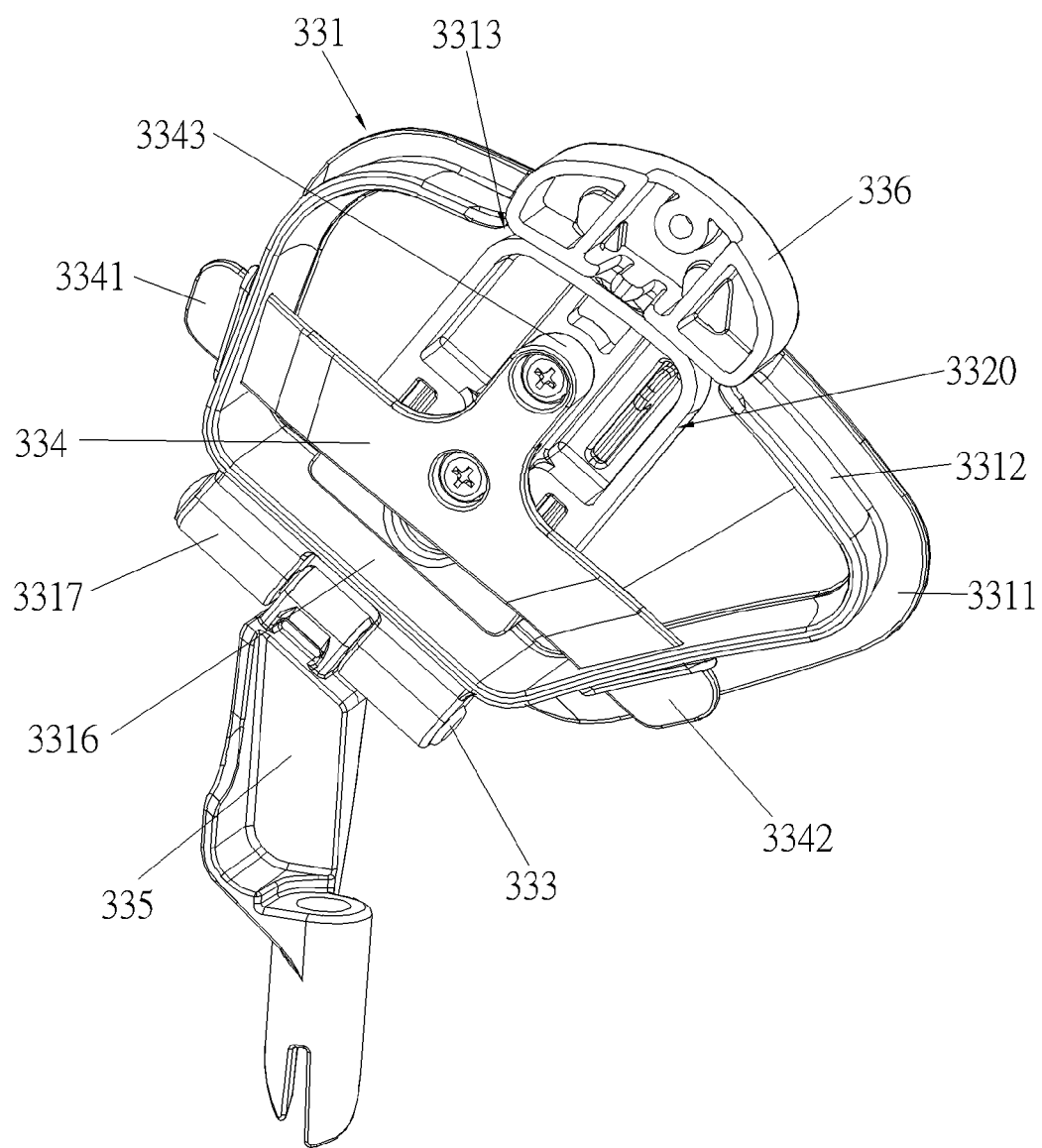
FIG. 20 is a schematic diagram of a lateral protecting mechanism of the child safety seat according to the third embodiment of the present invention.
Figure 21:
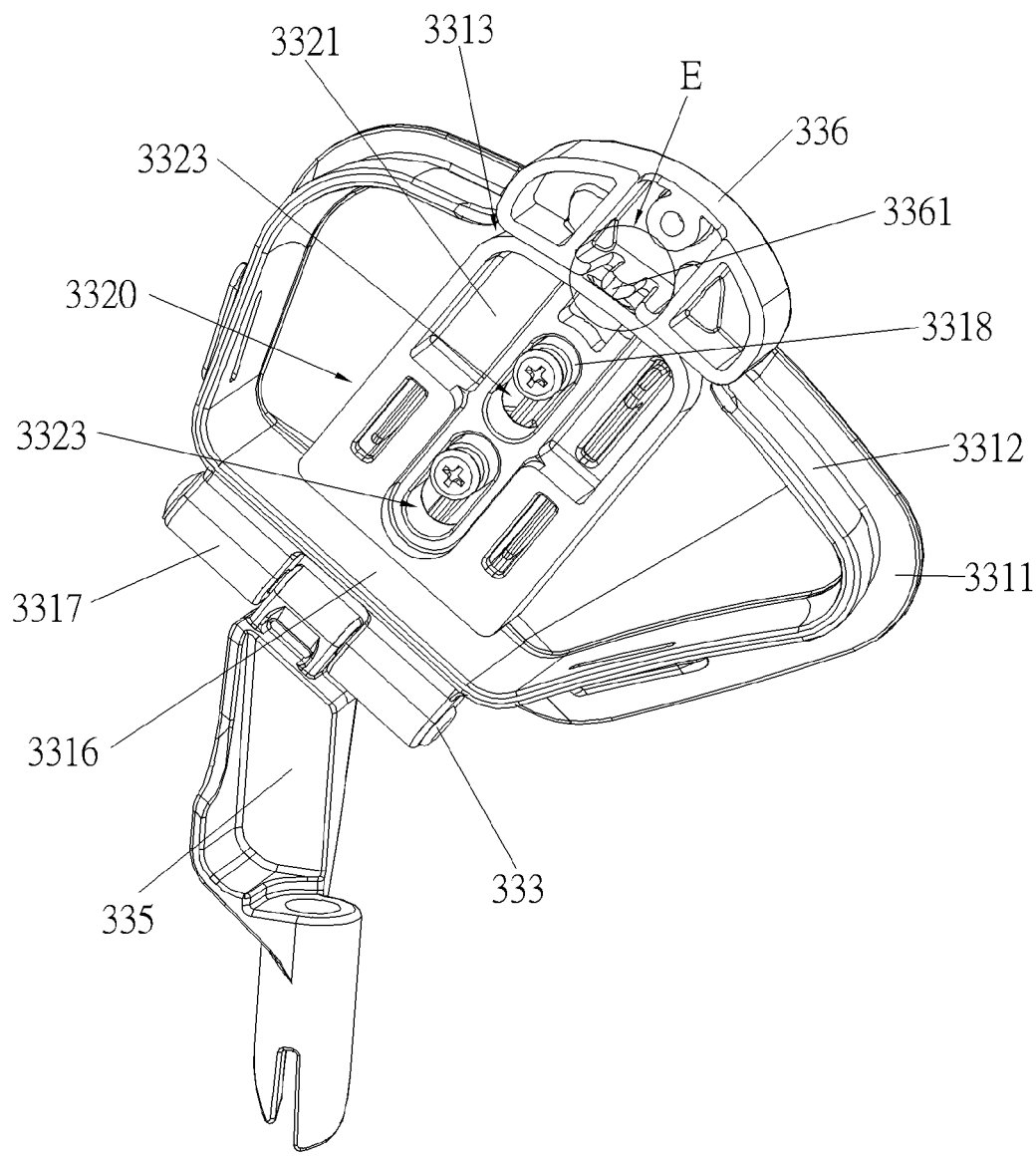
FIG. 21 is a schematic diagram of the lateral protecting mechanism of the child safety seat without illustrating a restraining block according to the third embodiment of the present invention.
Figure 22:
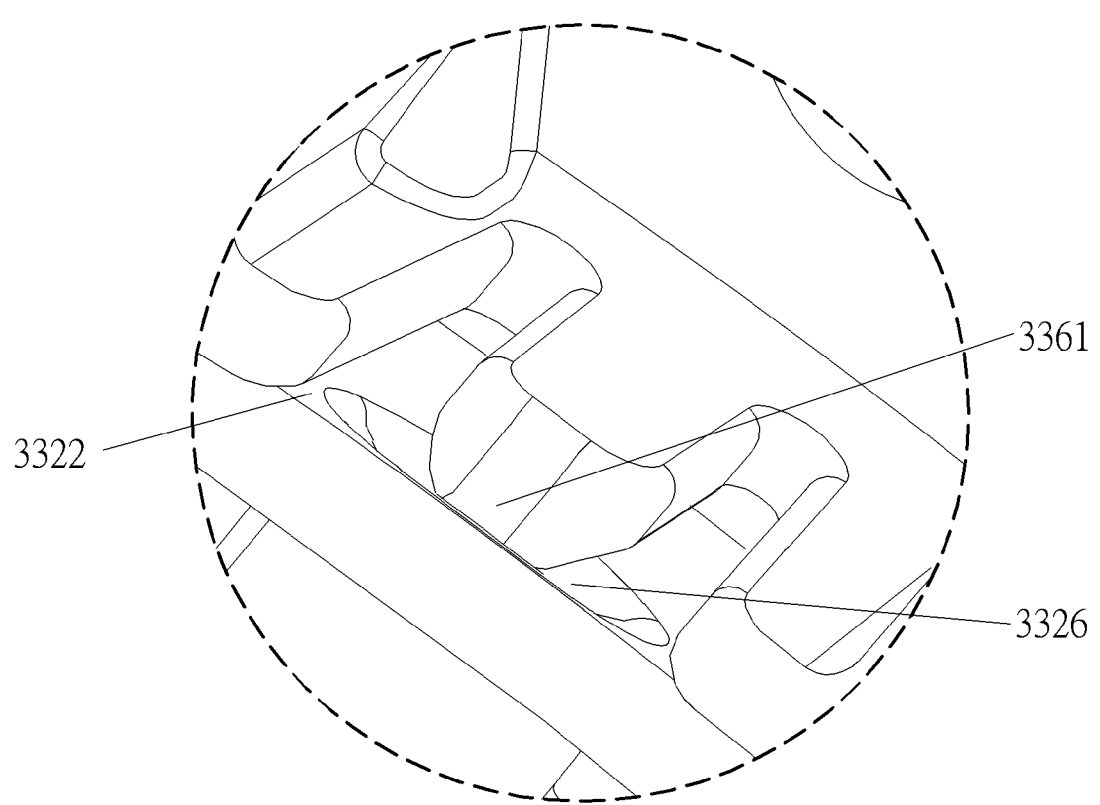
FIG. 22 is an enlarged diagram of an E portion of the lateral protecting mechanism of the child safety seat shown in FIG. 21 according to the third embodiment of the present invention.
Figure 23:
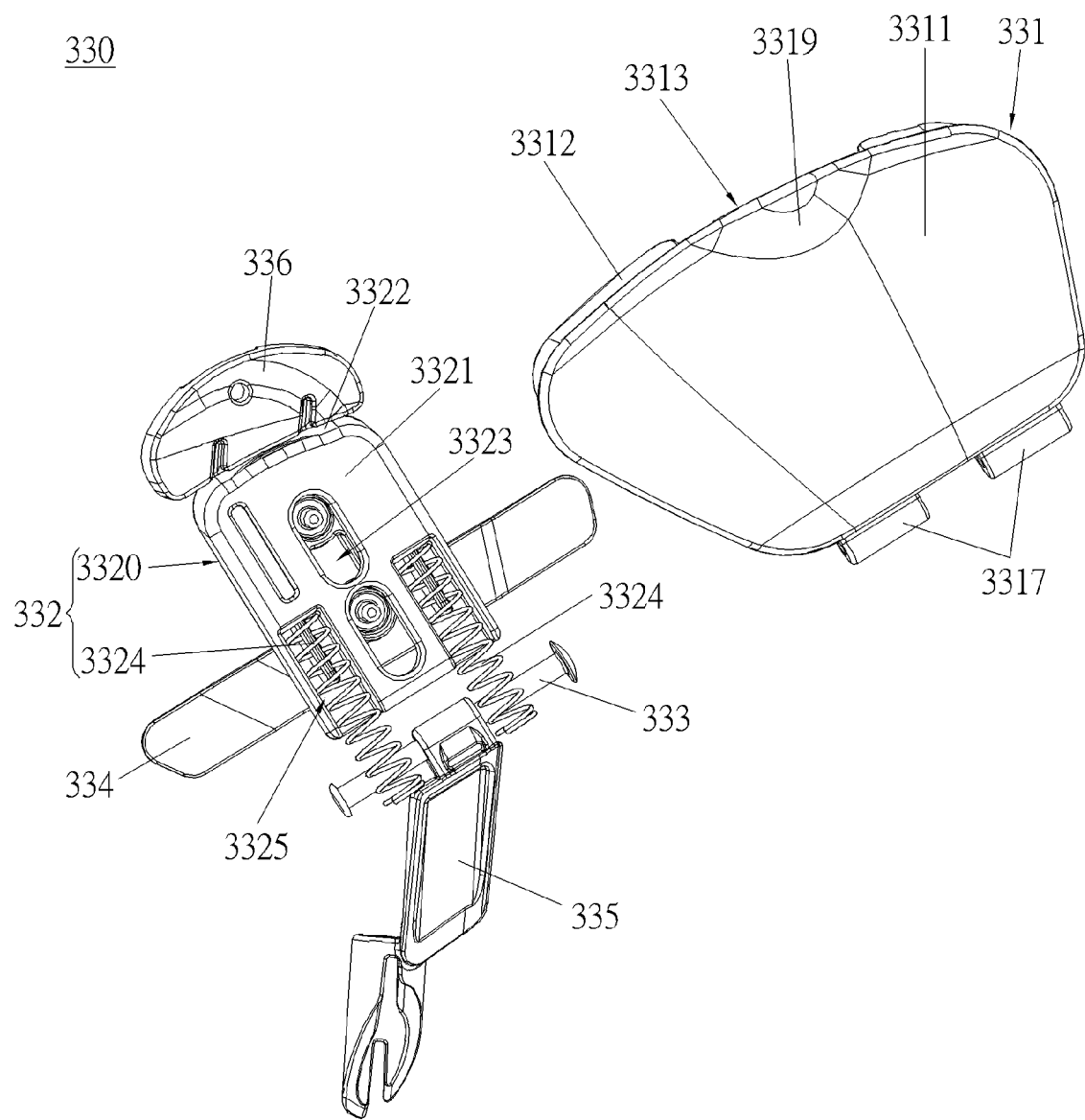
FIG. 23 is an exploded diagram of the child safety seat at another view according to the third embodiment of the present invention.

Please refer to FIG. 16 to FIG. 23. FIG. 16 is a schematic diagram of a child safety seat 300 according to a third embodiment of the present invention. FIG. 17 is a schematic diagram of the child safety seat without illustrating a cover 323 according to the third embodiment of the present invention. FIG. 18 is a schematic diagram of the child safety seat 300 without illustrating the cover 323 at another view according to the third embodiment of the present invention. FIG. 19 is an enlarged diagram of a D portion of the child safety seat 300 shown in FIG. 18 according to the third embodiment of the present invention. FIG. 20 is a schematic diagram of a lateral protecting mechanism 330 of the child safety seat 300 according to the third embodiment of the present invention. FIG. 21 is a schematic diagram of the lateral protecting mechanism 330 of the child safety seat 300 without illustrating a restraining block 334 according to the third embodiment of the present invention. FIG. 22 is an enlarged diagram of an E portion of the lateral protecting mechanism 330 of the child safety seat 300 shown in FIG. 21 according to the third embodiment of the present invention. FIG. 23 is an exploded diagram of the child safety seat 300 at another view according to the third embodiment of the present invention. The difference between the child safety seat 300 of the third embodiment and the child safety seats 100, 200 of the aforementioned embodiments is that connection between a cube 3320 and a lateral protecting block 331 of the third embodiment is different from the ones of the aforementioned embodiments. The detail of the connecting between the cube 3320 and the lateral protecting block 331 is described as follows.

Please refer to FIG. 21 to FIG. 23. In this embodiment, structure and connection of the lateral protecting block 331 is similar to the ones of the aforementioned embodiments. However, a positioning protrusion and an operating part disposed on the lateral protecting block 331 are optional. Preferably, the lateral protecting block 331 further includes an operating portion 3319 protruding from an edge of a base 3311 of the lateral protecting block 331 for easy operation.

The cube 3320 of a protecting component 332 is slidably disposed in an opening 3313 of an installing wall 3312. A pressing portion 3322 of the cube 3320 is exposed out of the installing wall 3312. The cube 3320 includes a sliding portion. The lateral protecting mechanism 330 further includes a guiding member disposed on the lateral protecting block 331. The cube 3320 is sliably connected to the opening 3313 by cooperation of the sliding portion and the guiding member. Specifically, the sliding portion is a guiding slot 3323 penetratingly formed on a body 3321 of the cube 3320. The guiding member is a column 3318 protruding from the lateral protecting block 331. A restraining slot 3325 is formed on a bottom end of the cube 3320. A positioning protrusion (not indicated in figures) protrudes from the restraining slot 3325. An end of a resilient member 3324 is sheathed on the positioning protrusion, received in the restraining slot 3325, and abuts against the cube 3320. The other end of the resilient member 3324 abuts against a connecting wall 3316. The resilient member 3324 provides a resilient force for recovering the cube.

Please refer to FIG. 20 to FIG. 23. In this embodiment, the lateral protecting mechanism 330 further includes a restraining block 334 fixed on the lateral protecting block 331. The cube 3320 is clamped between the restraining block 334 and the lateral protecting block 331. The restraining block 334 prevents the cube 3320 from moving away the column 3318 when the cube 3320 slides, for ensuring a protecting effect provided by the cube 3320. As shown in FIG. 20, the restraining block 334 has three connecting ends arranged as a T-shaped structure. Two connecting ends are respectively fixed on side walls of the lateral connecting block 331. The other connecting end is fixed on the column 3318. Specifically, the restraining block 334 has a bar-shaped connecting body. A first connecting end 3341 and a second connecting end 3342 are formed on two ends of the connecting body. A third connecting end 3343 protrudes from a middle portion of the connecting body. The first connecting end 3341 and the second connecting end 3342 are fixed on the side walls of the lateral protecting block 331. The third connecting end 3343 is sheathed on the column 3318 and fixed by a screw.

Please refer to FIG. 16 to FIG. 22. The lateral protecting mechanism 330 further includes a fixing member 335 and a pressing block 336. Two pivoting portions 3317 of the lateral protecting block 331 are spaced from each other at a distance. An end of the fixing member 335 is disposed between the two pivoting portions 3317 and pivoted to a shaft 333. The other end of the fixing member 335 is fixed on a lateral wing 332 of the child safety seat 300. The fixing member 335 improves installing stability of the lateral protecting mechanism 330. The pressing block 336 is fixed on the cover 323 of the child safety seat 300 and located near the protecting component 332. The pressing block 336 can increase rigidity of the cover 323 for reducing deformation of the cover 323 when the cover 323 is pressed. The pressing block 336 includes a resilient finger 3361 protruding toward the pressing portion 3322. A socket 3326 is formed on the pressing portion 3322. The resilient finger 3361 detachably engages with the socket 3326, as shown in FIG. 22. The operating principle of the lateral protecting mechanism 330 of this embodiment is similar to the ones of the aforementioned embodiments.

In contrast to the prior art, the present invention provides the lateral protecting mechanism with simple structure and the child safety seat therewith. Since the protecting component is located between the lateral swing and the lateral protecting block when the lateral protecting mechanism of the present invention is in use, the lateral protecting block will contact with a car body for effectively absorbing a lateral impact when a lateral collision occurs, which effectively ensures a child's safety.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lateral protecting mechanism disposed on a lateral wing of a child safety seat, the lateral protecting mechanism comprising:
  a lateral protecting block, an end of the lateral protecting block being pivoted to the lateral wing, the lateral protecting block being movable between a using position and a folding position; and
  a protecting component slidably disposed on the other end of the lateral protecting block;
  wherein the protecting component protrudes from a side of the lateral protecting block and is located between the lateral wing and the lateral protecting block when the lateral protecting block rotates away from the lateral wing and is located at the using position, and the protecting component is received in the side of the lateral protecting block when the lateral protecting block rotates toward the lateral wing and is located at the folding position.

2. The lateral protecting mechanism of claim 1, wherein the lateral protecting block comprises a base, a installing wall, and a connecting wall, a contacting surface is formed on a side of the base, the installing wall and the connecting wall protrude from the other side of the base and are opposite to each other, the lateral protecting block is pivoted to the lateral wing by the connecting wall, the protecting component is slidably disposed on the installing wall, and the protecting component protrudes from the installing wall and is located between the lateral wing and the base when the lateral protecting block is located at the using position.

3. The lateral protecting mechanism of claim 2, wherein an opening is formed on the installing wall, the protecting component is slidably disposed in the opening, and the protecting component slides to be received in the opening when the lateral protecting block is located at the folding position.

4. The lateral protecting mechanism of claim 3, wherein the protecting component comprises a cube and a resilient member, the cube is slidably disposed in the opening, and two ends of the resilient member abut between the cube and the lateral protecting block.

5. The lateral protecting mechanism of claim 4, wherein the cube comprises a body and a pressing portion, the body is corresponding to the opening, the pressing portion is formed on a side of the body, the body is slidably disposed in the opening, and when the lateral protecting block is located at the using position, the pressing portion protrudes from the installing wall, such that the body is located between the lateral wing and the base.

6. The lateral protecting mechanism of claim 5, wherein the cube further comprises a buffering rib protruding from the pressing portion and abutting against the lateral wing.

7. The lateral protecting mechanism of claim 4, wherein the cube further comprises a sliding portion, the lateral protecting mechanism comprises a guiding member disposed on the lateral protecting block, and the cube is slidably connected to the opening by the sliding portion and the guiding member.

8. The lateral protecting mechanism of claim 7, wherein the sliding portion is a protrusion disposed on an end of the cube, the guiding member is a groove formed on the lateral protecting block, and the protrusion is slidably received in the groove.

9. The lateral protecting mechanism of claim 8, further comprising a restraining member passing through the protrusion and slidably connected to the groove.

10. The lateral protecting mechanism of claim 7, wherein the sliding portion is a guiding slot formed on the cube, the guiding member is a column protruding from the lateral protecting block, and the guiding slot is slidably sheathed on the column.

11. The lateral protecting mechanism of claim 4, further comprising a restraining block fixed on the lateral protecting block, and the cube being clamped between the restraining block and the lateral protecting block.

12. The lateral protecting mechanism of claim 2, wherein the lateral protecting block comprises an operating part protruding outwardly and bent from an edge of the installing wall away from the contacting surface.

13. The lateral protecting mechanism of claim 2, wherein the lateral protecting block further comprises a positioning protrusion perpendicularly protruding from the installing wall, the lateral protecting mechanism further comprises a resilient protrusion formed on the lateral wing and corresponding to the positioning protrusion, and the resilient protrusion engages with the positioning protrusion when the lateral protecting block is located at the folding position.

14. The lateral protecting mechanism of claim 2, wherein the lateral protecting block further comprises a pivoting portion protruding from the connecting wall and pivoted to the lateral wing.

15. The lateral protecting mechanism of claim 2, further comprising a pressing block fixed on the lateral wing, the pressing block comprising a resilient finger protruding toward the installing wall, a socket being formed on a side of the protecting component protruding from the installing wall, and the resilient finger detachably engaging with the socket.

16. The lateral protecting mechanism of claim 1, further comprising a fixing member fixed on the lateral wing, the fixing member being pivoted to an end of the lateral protecting block pivoted to the lateral wing.

17. A child safety seat comprising:
  a seat;
  a seatback comprising two lateral wings opposite to each other; and
  two lateral protecting mechanisms disposed on the two lateral wings of the child safety seat respectively, and each of the two lateral protecting mechanisms comprising:
    a lateral protecting block being movable between a using position and a folding position; and
    a protecting component slidably disposed on the lateral protecting block;
  wherein the protecting component protrudes from a side of the lateral protecting block and is located between the lateral wing and the lateral protecting block when the lateral protecting block moves away from the lateral wing and is located at the using position, and the protecting component is received in the side of the lateral protecting block when the lateral protecting block moves toward the lateral wing and is located at the folding position.

18. The child safety seat of claim 17, wherein an end of the lateral protecting block is pivoted to the lateral wing, the protecting component is slidably disposed on the other end of the lateral protecting block, the protecting component protrudes from the side of the lateral protecting block and is located between the lateral wing and the lateral protecting block when the lateral protecting block rotates away from the lateral wing and is located at the using position, and the protecting component is received in the side of the lateral protecting block when the lateral protecting rotates toward the lateral wing and is located at the folding position.

19. The child safety seat of claim 18, wherein two installing holes are formed on the two lateral wings and corresponding to the two lateral protecting mechanisms, and the two lateral protecting mechanisms are pivoted to the two lateral wings and received in the two installing holes respectively.

20. The child safety seat of claim 18, further comprising two covers connected to the two lateral wings, two through holes being formed on the two covers and corresponding to the two lateral protecting mechanisms, each of the two lateral protecting mechanisms being received in the corresponding through hole, and each of the two protecting components detachably abutting against the corresponding cover.

\* \* \* \* \*